United States Patent
Babaei et al.

(10) Patent No.: US 10,687,319 B2
(45) Date of Patent: Jun. 16, 2020

(54) GROUP POWER CONTROL FOR A SECONDARY CELL

(71) Applicant: Comcast Cable Communications, LLC, Philadelphia, PA (US)

(72) Inventors: Alireza Babaei, Fairfax, VA (US); Esmael Hejazi Dinan, Herndon, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 15/671,801

(22) Filed: Aug. 8, 2017

(65) Prior Publication Data

US 2018/0041997 A1 Feb. 8, 2018

Related U.S. Application Data

(60) Provisional application No. 62/372,120, filed on Aug. 8, 2016.

(51) Int. Cl.
*H04W 72/04* (2009.01)
*H04W 52/32* (2009.01)
(Continued)

(52) U.S. Cl.
CPC ......... *H04W 72/042* (2013.01); *H04W 48/16* (2013.01); *H04W 52/325* (2013.01); *H04W 52/40* (2013.01); *H04W 52/58* (2013.01)

(58) Field of Classification Search
None
See application file for complete search history.

(56) References Cited

U.S. PATENT DOCUMENTS

2010/0098012 A1\* 4/2010 Bala ............... H04W 72/0446 370/329
2011/0105107 A1   5/2011 Kwon et al.
(Continued)

FOREIGN PATENT DOCUMENTS

EP    2763338 A1    8/2014

OTHER PUBLICATIONS

3GPP TS 36.213 V13.2.0 (Jun. 2016), Technical Specification, 3rd Generation Partnership Project; Technical Specification Group Radio Access Network; Evolved Universal Terrestrial Radio Access (E-UTRA);Physical layer procedures (Release 13).
(Continued)

*Primary Examiner* — Andrew C Oh
(74) *Attorney, Agent, or Firm* — Banner & Witcoff, Ltd.

(57) ABSTRACT

A wireless device may receive message(s) comprising configuration parameters for cells comprising a primary cell and a secondary cell. The configuration parameters may comprise: a transmit power control (TPC) radio network temporary identifier (RNTI), a primary TPC index for a first physical uplink shared channel (PUSCH) of the primary cell, a secondary TPC index for a second PUSCH of the secondary cell, and periodic resource allocation configuration parameters configuring a periodic resource allocation for the secondary cell. A first downlink control information (DCI) may be received indicating activation of the periodic resource allocation. A common search space for a second DCI associated with the TPC RNTI may be monitored. The second DCI may comprise a sequence of TPC commands. The secondary TPC index may identify a TPC command in the sequence. Transport blocks may be transmitted by employing transmission parameter(s) in the first DCI and the TPC command.

24 Claims, 20 Drawing Sheets

(51) Int. Cl.
*H04W 48/16* (2009.01)
*H04W 52/40* (2009.01)
*H04W 52/58* (2009.01)

(56) References Cited

U.S. PATENT DOCUMENTS

| | | | |
|---|---|---|---|
| 2011/0249578 A1* | 10/2011 | Nayeb Nazar | H04L 1/0027 370/252 |
| 2012/0281576 A1* | 11/2012 | Yamada | H04L 1/0046 370/252 |
| 2013/0028229 A1 | 1/2013 | Suh et al. | |
| 2013/0058233 A1 | 3/2013 | Kim | |
| 2013/0077514 A1* | 3/2013 | Dinan | H04L 5/00 370/252 |
| 2013/0121297 A1 | 5/2013 | Kim et al. | |
| 2013/0301509 A1 | 11/2013 | Purnadi et al. | |
| 2014/0016593 A1 | 1/2014 | Park et al. | |
| 2014/0241319 A1* | 8/2014 | Lee | H04L 1/0026 370/331 |
| 2014/0344472 A1 | 11/2014 | Lovsen et al. | |
| 2015/0043429 A1 | 2/2015 | Kim et al. | |
| 2015/0181576 A1 | 6/2015 | Papasakellariou et al. | |
| 2015/0289144 A1* | 10/2015 | Yi | H04W 36/22 370/252 |
| 2015/0365831 A1* | 12/2015 | Ko | H04L 5/001 370/329 |
| 2015/0365963 A1 | 12/2015 | Won et al. | |
| 2016/0100353 A1 | 4/2016 | Gleixner | |
| 2016/0204905 A1 | 7/2016 | Lee et al. | |
| 2016/0205669 A1* | 7/2016 | Kusashima | H04W 72/042 |
| 2016/0227486 A1* | 8/2016 | Park | H04W 72/0413 |
| 2016/0227602 A1 | 8/2016 | Yi et al. | |
| 2016/0286495 A1* | 9/2016 | Dinan | H04W 28/0221 |
| 2016/0295624 A1 | 10/2016 | Novlan et al. | |
| 2016/0330697 A1* | 11/2016 | Chen | H04W 52/365 |
| 2017/0013611 A1* | 1/2017 | Dinan | H04W 52/146 |
| 2017/0019237 A1* | 1/2017 | Yang | H04L 5/001 |
| 2017/0019887 A1 | 1/2017 | Jiang et al. | |
| 2017/0041123 A1* | 2/2017 | Yang | H04L 1/1812 |
| 2017/0245245 A1 | 8/2017 | Kim et al. | |
| 2017/0273027 A1* | 9/2017 | Kim | H04W 72/042 |
| 2017/0325076 A1 | 11/2017 | Fujishiro et al. | |
| 2017/0347270 A1 | 11/2017 | Iouchi et al. | |
| 2017/0359746 A1* | 12/2017 | Lee | H04L 5/00 |
| 2017/0374665 A1 | 12/2017 | Lee et al. | |
| 2018/0007667 A1* | 1/2018 | You | H04L 5/14 |
| 2018/0007680 A1 | 1/2018 | Lee et al. | |
| 2018/0007693 A1 | 1/2018 | Lee et al. | |
| 2018/0013533 A1* | 1/2018 | Yang | H04L 1/1671 |
| 2018/0027461 A1 | 1/2018 | Jia et al. | |
| 2018/0035276 A1 | 2/2018 | Kang et al. | |
| 2018/0035340 A1 | 2/2018 | Fujishiro et al. | |
| 2018/0048498 A1* | 2/2018 | Stern-Berkowitz | H04L 27/0006 |
| 2018/0049225 A1 | 2/2018 | Lee et al. | |
| 2018/0124707 A1 | 5/2018 | Lee et al. | |
| 2018/0124774 A1* | 5/2018 | Takahashi | H04B 7/0645 |
| 2018/0124824 A1* | 5/2018 | Lee | H04L 5/0044 |
| 2018/0131598 A1* | 5/2018 | Suzuki | H04L 5/001 |
| 2018/0139750 A1* | 5/2018 | Takahashi | H04B 7/06 |
| 2018/0152954 A1* | 5/2018 | Golitschek Edler Von Elbwart | H04W 74/0808 |
| 2018/0159675 A1* | 6/2018 | Yang | H04L 5/0055 |
| 2018/0159935 A1 | 6/2018 | Cavalcanti et al. | |
| 2018/0192268 A1 | 7/2018 | Xu et al. | |
| 2018/0206089 A1 | 7/2018 | Cavalcanti et al. | |
| 2018/0234998 A1* | 8/2018 | You | H04W 72/042 |
| 2018/0255569 A1 | 9/2018 | Aiba et al. | |
| 2019/0014563 A1 | 1/2019 | Lee et al. | |
| 2019/0098698 A1 | 3/2019 | Fukuta | |
| 2019/0182644 A1 | 6/2019 | Zheng et al. | |
| 2019/0245657 A1 | 8/2019 | Lee et al. | |

OTHER PUBLICATIONS

3GPP TS 36.300 V13.4.0 (Jun. 2016), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.321 V13.2.0 (Jun. 2016), Technical Specification, 3rd Generation Partnership Project; Technical Specification Group Radio Access Network; Evolved Universal Terrestrial Radio Access (E-UTRA);Medium Access Control (MAC) protocol specification (Release 13).
3GPP TS 36.331 V13.2.0 (Jun. 2016), Technical Specification, 3rd Generation Partnership Project; Technical Specification Group Radio Access Network; Evolved Universal Terrestrial Radio Access (E-UTRA); Radio Resource Control (RRC); Protocol specification (Release 13).
R1-164878, 3GPP TSG RAN WG1 Meeting #85, Nanjing, China May 23-27, 2016, Source: CMCC, Title: Discussion on SPS configurations.
R1-162122, 3GPP TSG RAN WG1 Meeting #84bis, Busan, Korea, Apr. 11-15, 2016, Agenda Item: 7.3.2.2.2, Source: Huawei, HiSilicon, Title: SPS enhancement for V2V.
R1-162340, 3GPP TSG RAN WG1 Meeting #84 bis, Busan, Korea, Apr. 11-15, 2016, Source: OPPO, Title: Discussion on the SPS configuration.
R1-162413, 3GPP TSG-RAN WG1 Meeting #84bis, Busan, Korea Apr. 11-15, 2016, Source: ZTE, Title: Discussion on V2V SPS resource scheme.
R1-162500, RAN WG1 Meeting #84bis, Busan, Korea, Apr. 11-15, 2016, Source: LG Electronics, Title: Discussions on UL enhancements for V2X.
R1-164421, 3GPP TSG-RAN WG1 #85, May 23-27, 2016, Nanjing, China, Agenda item: 6.2.2.3.1, Source: Qualcomm Incorporated, Title: eNodeB signaling for SPS resource allocation.
R1-164422, 3GPP TSG-RAN WG1 #85, May 23-27, 2016, Nanjing, China, Agenda item: 6.2.2.3.2, Source: Qualcomm Incorporated, Title: UE reporting for eNodeB resource allocation.
R1-164468, 3GPP TSG RAN WG1 Meeting #85, Nanjing, China, May 23-27, 2016, Source: Guangdong OPPO Mobile Telecom, Title: Discussion on the SPS configuration for mode-2.
R1-164514, 3GPP TSG RAN WG1 Meeting #85, Nanjing, China May 23-27, 2016, Source: LG Electronics, Title: Discussion on details of (E)PDCCH used for sidelink SPS.
R1-164515, 3GPP TSG RAN WG1 Meeting #85, Nanjing, China, May 23-27, 2016, Agenda item: 6.2.2.3.2, Source: LG Electronics, Title: Discussion on details of UE reporting.
R1-164538' 3GPP TSG RAN WG1 Meeting #85, Nanjing, China, May 23-27, 2016, Source: LG Electronics, Title: Discussion on UL SPS for V2X.
R1-164762, 3GPP TSG RAN WG1 Meeting #85, Nanjing, May 23-27, 2016, Agenda Item: 6.2.2.3.1, Source: Samsung, Title: Multiple SPS configuration support for SL.
R1-164763, 3GPP TSG RAN WG1 Meeting #85, Nanjing, May 23-27, 2016, Agenda Item: 6.2.2.3.2, Source: Samsung, Title: UE reporting procedure for SL SPS transmissions.
R1-164818, 3GPP TSG RAN WG1 Meeting #85, Nanjing, China, May 23-27, 2016, Agenda Item: 6.2.2.3, Source: Huawei, HiSilicon, Title: SPS enhancement for V2V.
R1-164906, 3GPP TSG RAN WG1 Meeting #85, Nanjing, China May 23-27, 2016, Source: Panasonic, Title: Signaling design to support SPS activation/release in V2V.
R1-164963, 3GPP TSG-RAN WG1 Meeting #85, Nanjing, China May 23-27, 2016, Source: ZTE, Title: Trigger and release of V2V SPS resources.
R1-164964, 3GPP TSG RAN WG1 Meeting #85, Nanjing, China May 23-27, 2016, Agenda item: 6.2.2.3.2, Source: ZTE, Title: Discussion on UE reporting.
R1-165193, 3GPP TSG RAN WG1 Meeting #85, Nanjing, China May 23-27, 2016, Source: NTT DOCOMO, Inc., Title: (E)PDCCH for sidelink SPS configuration switching.
R1-165194, 3GPP TSG RAN WG1 Meeting #85, Nanjing, China May 23-27, 2016, Source: NTT DOCOMO, Inc., Title: UE reporting for sidelink SPS operation.

(56) References Cited

OTHER PUBLICATIONS

R1-165246, 3GPP TSG RAN WG1 Meeting #85, Nanjing, PRC, May 23-27, 2016, Source: Ericsson, Title: Contents of Downlink Control Information for V2V over PC5.
R1-165272, 3GPP TSG RAN WG1 Meeting #85, Nanjing, PRC, May 23-27, 2016, Source: Ericsson, Title: Mode-1 SPS for V2V over PC5.
R1-165274, 3GPP TSG RAN WG1 Meeting #85, Nanjing, May 23-27, 2016, Source: Ericsson, Title: UL SPS and reporting to eNB for V2X.
R1-165309, 3GPP TSG RAN WG1 Meeting #85, Nanjing, China May 23-27, 2016, Source: Panasonic, Title: Details on PC5 SPS enhancement.
R2-162197, 3GPP TSG-RAN2 Meeting #93bis, Dubrovnik, Croatia, Apr. 11-15, 2016, Agenda Item: 8.2.1, Source: OPPO, Title: Discussion on SPS Enhancements for V2V.
R2-162454, 3GPP TSG RAN WG2 Meeting #93bis, Dubrovnik, Croatia, Apr. 11-15, 2016, Agenda item:8.2.1, Source: Intel Corporation, Title: SL resource allocation in SPS manner.
R2-162927, 3GPP TSG-RAN2 Meeting #93bis, Dubrovnik, Croatia, Apr. 11-15, 2016, Agenda item: 8.2.1, Source: LG Electronics Inc., Title: SL SPS enhancement for V2V.
R2-163406, 3GPP TSG-RAN2 Meeting #94, Nanjing, P. R. China, Apr. 23-27, 2016, Agenda Item: 8.11.1, Source: OPPO, Title: Discussion on SPS Enhancements for V2X.
R2-163421, 3GPP TSG-RAN WG2 Meeting #94, Nanjing, China, May 23-25, 2016, Source: CATT, Title: Consideration on SPS Enhancement.
R2-163451, 3GPP TSG RAN WG2 Meeting #94, Nanjing, China, Apr. 23-25, 2016, Agenda Item: 8.2.4, Source: Samsung, Title: UE reporting and dynamic SL SPS transmission.
R2-163807, 3GPP TSG-RAN WG2 Meeting #94, Nanjing, China, May 23-27, 2016, Agenda Item: 8.11.1, Source: Huawei, HiSilicon, InterDigital, LG Electronics Inc., OPPO, Title: Discussions on CAM Characteristics.
R2-163812, 3GPP TSG-RAN WG2 #94, Nanjing, China, May 23-27, 2016, Agenda Item: 8.2.4, Source: Huawei, HiSilicon, Title: Enhancements for Sidelink Resource Allocation.
R2-163840, 3GPP TSG RAN WG2 #94, Nanjing, China, May 23, 27, 2016, Source: ZTE, Title: SPS enhancements for V2X over Uu.
R2-163865, 3GPP TSG RAN WG2 Meeting #94, Nanjing, China, May 23-25, 2016, Source: ITL, Title: SL SPS for V2V.
R2-163885, 3GPP TSG RAN WG2 Meeting #94, Nanjing, China, May 23-27, 2016, Source: Potevio, Title: UE assisted information for SPS.
R2-163900, 3GPP TSG-RAN WG2 Meeting #94, Nanjing, China, May 23-27, 2016, Agenda item: 8.11.1, Source: Nokia, Alcatel-Lucent Shanghai Bell, Title: Multiple inter-dependent UL SPS occasions.
R2-164063, 3GPP TSG-RAN WG2 Meeting #94, Nanjing, China, May 23-27, 2016, Agenda item: 8.2.4, Source: Qualcomm Incorporated, Title: SPS for V2V Communication.
R2-164079, 3GPP TSG-RAN2 Meeting #94, Nanjing, China, Apr. 11-15, 2016, Agenda item: 8.2.4, Source: LG Electronics Inc. Title: Support of Semi-Persistent Scheduling for PC5 mode 1.
R2-164082, 3GPP TSG-RAN2 Meeting #94, Nanjing, China, Apr. 11-15, 2016, Agenda item: 8.11.1, Source: LG Electronics Inc, InterDigital, OPPO, Huawei, Title: Proposed TP for UL SPS enhancements.
R2-164377, 3GPP TSG-RAN WG2 Meeting #94, Nanjing, China, May 23-27, 2016, Agenda item: 8.11.1, Source: Huawei, HiSilicon, Title: TP on CAM Characteristics.
Tdoc R2-161571, 3GPP TSG-RAN WG2 #93, St. Julians, Malta, Feb. 15-19, 2016, Agenda Item: 7.11, Source: Ericsson, Title: Overview of V2X Enhancements for Further RAN2 Work.
Tdoc R2-164112, 3GPP TSG-RAN WG2 #94, Nanjing, P.R. China, May 23-27, 2016, Agenda Item: 8.11.1, Source: Ericsson, Title: SPS Enhancements for Uu Operations in V2X.

R2-167928; 3GPP TSG RAN WG2 Meeting #96; Reno, USA, Nov. 14-18, 2016; Agenda Item: 8.13.3; Source: Huawei, HiSilicon; Title: Discussion on P2X Sidelink Communication.
R2-167930; 3GPP TSG RAN WG2 Meeting #96; Reno, USA, Nov. 14-18, 2016; Agenda Item: 8.13.2; Source: Huawei, HiSilicon; Title: Discussions on Remaining Issues for SPS.
R2-167934; 3GPP TSG RAN WG2 Meeting #96; Reno, USA, Nov. 14-18, 2016; Agenda Item: 8.13.1; Source: Huawei, HiSilicon; Title: Multi-PLMN operation for Uu-based V2X.
R2-167998; 3GPP TSG RAN WG2 Meeting #96; Reno, USA, Nov. 14-18, 2016; Agenda item: 8.13.2; Source: Potevio; Title: Details of LCP for enhanced SPS configurations.
R2-167999; 3GPP TSG RAN WG2 Meeting #96; Reno, USA, Nov. 14-18, 2016; Source: Potevio; Title: Discussion on SPS configuration related issues.
R2-168043; 3GPP TSG-RAN WG2 #96; Reno, USA, Nov. 14-18, 2016; Agenda item: 8.13.3; Source: Kyocera; Title: Consideration of the P2V transmission scheme.
R2-168045; 3GPP TSG RAN WG2 #96; Reno, USA, Nov. 14-18, 2016; Agenda Item: 8.13.1; Souce: Samsung; Title: Supporting small and variable Service Area in non-overlapped local MBMS service area.
R2-168068; 3GPP TSG-RAN WG2 Meeting #96; Reno, Nevada, USA, Nov. 14-18, 2016; Agenda item: 8.13.3; Source: Samsung; Title: Resource configuration for P2V.
R2-168083; 3GPP TSG RAN WG2 Meeting #96; Reno, USA, Nov. 14-18, 2016; Source: CATT; Title: Discussion on Impact of LCP procedure in V2X SPS resource usage; Agenda Item: 8.13.2.
R2-168084; 3GPP TSG RAN WG2 Meeting #96; Reno, USA, Nov. 14-18, 2016; Source: CATT, ZTE, Potevio; Title: Discussion on V2X SPS.
R2-168085; 3GPP TSG-RAN WG2 Meeting #96; Reno, USA, Nov. 14-18, 2016; Source: CATT; Title: Consideration on pool management and resource selection.
R2-168137; 3GPP TSG-RAN WG2 #96; Reno, USA, Nov. 14-18, 2016; Agenda Item: 8.13.2; Source: ZTE; Title: Discussion on SPS related issues.
R2-168139; 3GPP TSG-RAN WG2 Meeting #96; Reno, USA, Nov. 14-18, 2016; Title: MBMS enhancement for Uu based V2X communication; Source: ZTE Corporation.
R2-168144; 3GPP TSG-RAN WG2 Meeting #96; Reno, USA, Nov. 14-18, 2016; Title: Discussion on V2P aspects; Source: ZTE.
R2-168273; 3GPP TSG-RAN WG2 Meeting #96; Reno, USA, Nov. 14-18, 2016; Agenda Item: 8.13.3; Source: Coolpad; Title: Discussion on power saving for PCS-based V2P.
R2-168409; 3GPP TSG-RAN WG2 #96; Reno, USA, Aug. 14-18, 2016; Agenda Item: 8.13.2; Source: LG Electronics Inc.; Title: SPS and UE assistant information for V2X.
R2-168410; 3GPP TSG-RAN WG2 #96; Reno, USA, Nov. 14-18, 2016; Agenda Item : 8.13.3; Source: LG Electronics Inc.; Title: Support for V2P service.
R2-168426; 3GPP TSG-RAN WG2 Meeting #96; Reno, USA, Nov. 14-18, 2016; Agenda item: 8.13.3; Source: Nokia, Alcatel-Lucent Shanghai Bell; Title: Efficient V2P/P2V activation.
R2-168427; 3GPP TSG-RAN WG2 Meeting #96; Reno, USA, Nov. 14-18, 2016; Agenda item: 8.13.2; Source: Nokia, Alcatel-Lucent Shanghai Bell; Title: Further discussion on SPS enhancements.
R2-168486; 3GPP TSG-RAN WG2 #96; Reno, Nevada, USA, Nov. 14-18, 2016; Agenda Item: 9.3.1.1.3; Source: Ericsson; Title: Consideration on mobility for URLLC and eV2x.
R2-168642; 3GPP TSG-RAN WG2 #96; Reno, Nevada, USA, Nov. 14-18, 2016; Agenda Item: 8.13.3; Source: Ericsson; Title: Discussion on Sidelink Operations for Pedestrian.
R2-168653; 3GPP TSG-RAN WG2 #96; Reno, Nevada, USA, Nov. 14-18, 2016; Agenda Item: 8.13.2; Source: Ericsson; Title: SPS Protocol for Uu.
R2-168701; 3GPP TSG-RAN WG2 #96; Reno, Nevada, USA, Nov. 14-18, 2016; Agenda Item: 8.13.2; Source: Ericsson, Interdigital, Qualcomm; Title: Configuration of UE Assistance Information.
R2-168702; 3GPP TSG-RAN WG2 #96; Reno, Nevada, USA, Nov. 14-18, 2016; Agenda Item: 8.13.2; Source: Ericsson, Interdigital, ITL; Title:vSidelink SPS Configuration.

(56) References Cited

OTHER PUBLICATIONS

R2-168789; 3GPP TSG RAN WG2 Meeting #96; Reno, NV, USA, Nov. 14-18, 2016; Title: DRAFT LS reply on Voice and Video enhancement for LTE.

International Search Report dated Jan. 11, 2018 in International Application No. PCT/US2017/045754.

R2-164105, 3GPP TSG-RAN WG2 Meeting #94, Nanjing, China, May 23-27, 2016, Source: Ericsson, Title: Sidelink Resource Allocation in V2X.

R2-163836, 3GPP TSG-RAN WG2 Meeting #94, Nanjing, China, May 23-27, 2016, Source: ZTE, Title: SPS enhancements for V2V over PC5.

3GPP TS 36.213 V11.3.0 (Jul. 2013), Technical Specification, 3rd Generation Partnership Project; Technical Specification LTE; Evolved Universal Terrestrial Radio Access (E-UTRA); (Release 11).

3GPP TS 22.185 V0.2.0 (Feb. 2016), Technical Specification, 3rd Generation Partnership Project; Technical Specification Group Services and System Aspects; Service requirements for V2X services; Stage 1 (Release 14).

3GPP TS 23.203 V13.7.0 (Mar. 2016), Technical Specification, 3rd Generation Partnership Project; Technical Specification Group Services and System Aspects; Policy and charging control architecture (Release 13).

3GPP TS 23.303 V13.3.0 (Mar. 2016), Technical Specification, 3rd Generation Partnership Project; Technical Specification Group Services and System Aspects; Proximity-based services (ProSe); Stage 2 (Release 13).

3GPP TS 24.334 V13.3.1 (Mar. 2016), Technical Specification, 3rd Generation Partnership Project; Technical Specification Group Core Network and Terminals; Proximity-services (ProSe) User Equipment (UE) to Prose function protocol aspects; Stage 3, (Release 13).

3GPP TS 29.214 V13.5.0 (Mar. 2016), Technical Specification, 3rd Generation Partnership Project; Technical Specification Group Core Network and Terminals; Policy and Charging Control over Rx reference point, (Release 13).

3GPP TS 36.211 V14.0.0 (Sep. 2016); Technical Specification; 3rd Generation Partnership Project; Technical Specification Group Radio Access Network; Evolved Universal Terrestrial Radio Access (E-UTRA); Physical channels and modulation (Release 14).

3GPP TS 36.212 V14.0.0 (Sep. 2016); Technical Specification; 3rd Generation Partnership Project; Technical Specification Group Radio Access Network; Evolved Universal Terrestrial Radio Access (E-UTRA); Multiplexing and channel coding (Release 14).

3GPP TS 36.213 V14.0.0 (Sep. 2016); Technical Specification; 3rd Generation Partnership Project; Technical Specification Group Radio Access Network; Evolved Universal Terrestrial Radio Access (E-UTRA); Physical layer procedures (Release 14).

3GPP TS 36.300 V14.0.0 (Sep. 2016); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).

3GPP TS 36.321 V14.0.0 (Sep. 2016); Technical Specification; 3rd Generation Partnership Project; Technical Specification Group Radio Access Network; Evolved Universal Terrestrial Radio Access (E-UTRA); Medium Access Control (MAC) protocol specification (Release 14).

3GPP TS 36.331 V14.0.0 (Sep. 2016); Technical Specification; 3rd Generation Partnership Project; Technical Specification Group Radio Access Network; Evolved Universal Terrestrial Radio Access (E-UTRA); Radio Resource Control (RRC); Protocol specification (Release 14).

R2-162236; 3GPP TSG-RAN WG2 Meeting #93bis; Apr. 11-15, 2016, Dubrovnik, Croatia; Agenda Item: 8.8.2; Souce: Samsung; Title:Discussion on acknowledging SPS command.

R2-162264; 3GPP TSG-RAN WG2 Meeting #93b; Dubrovnik, Croatia, Apr. 11-15, 2016; Agenda item: 8.8.2; Source: Huawei, HiSilicon; Title: On UL grants skipping.

R2-162265; 3GPP TSG-RAN WG2 Meeting #93bis; Dubrovnik, Croatia, Apr. 11-15, 2016; Agenda Item 8.8.2; Source: Huawei, HiSilicon; Title: Implicit SPS release under UL grants skipping.

R2-162266; 3GPP TSG-RAN WG2 Meeting #93b; Dubrovnik, Croatia, Apr. 11-15, 2016; Agenda item: 8.8.2; Source: Huawei, HiSilicon; Title: Necessity of feedback for SPS activation and deactivation.

R2-162415; 3GPP TSG-RAN WG2 Meeting #93bis; Dubrovnik, Croatia, Apr. 11-15, 2016; Agenda Item: 8.8.1; Source: CMCC; Title: Remaining issues related to UL SPS.

R2-162466; 3GPP TSG-RAN2 Meeting #93bis; Dubrovnik, Croatia Apr. 11-15, 2016; Agenda item: 8.8.1; Source: Intel Corporation; Title: Further aspects of short SPS interval.

R2-162467; 3GPP TSG-RAN2 Meeting #93bis; Dubrovnik, Croatia Apr. 11-15, 2016; Agenda item:8.8.2;Source: Intel Corporation; Title: Further aspects of UL grant skipping.

R2-162468; 3GPP TSG-RAN2 Meeting #93bis; Dubrovnik, Croatia Apr. 11-15, 2016; Agenda item: 8.8.3; Source: Intel Corporation; Title: SPS activation, reactivation and deactivation feedback.

R2-162515; 3GPP TSG RAN WG2 Meeting #93bis; Dubrovnik, Croatia, Apr. 11-15, 2016; Source:CATT; Title: Feedback for SPS PDCCH command.

R2-162572; 3GPP TSG-RAN WG2 Meeting #93bis; Dubrovnik, Croatia, Apr. 11-15, 2016; Source: ZTE Corporation; Title: Discussion on the feedback of the SPS activation command.

R2-162601; 3GPP TSG-RAN2 Meeting #93bis; Republika Hrvatska, Dubrovnik, Apr. 11-15, 2016; Agenda Item:8.8.2-LTE Rel-14: WI: L2 latency reduction techniques; Source: ASUSTeK;Title:Discussion on skipping UL grants.

R2-162781; 3GPP TSG-RAN WG2 #93bis; Dubrovnik, Croatia, Apr. 11-15, 2016; Agenda Item: 8.8.3; Source: Ericsson; Title: Acknowledgements for SPS commands.

R2-162901; 3GPP TSG-RAN WG2 Meeting #93bis; Dubrovnik, Croatia, Apr. 11-15, 2016; Agenda Item: 8.8.2 (LTE_LATRED_L2-Core); Source: LG Electronics Inc.; Title: Need for feedback of SPS command.

R2-162902; 3GPP TSG-RAN WG2 Meeting #93bis; Dubrovnik, Croatia, Apr. 11-15, 2016; Agenda Item: 8.8.2 (LTE_LATRED_L2-Core); Source: LG Electronics Inc.; Title: SPS feedback transmission.

R2-162909; 3GPP TSG-RAN2 Meeting #93bis; Dubrovnik, Croatia, Apr. 12-16, 2016; Agenda item: 8.8.2;Source: Qualcomm Incorporated; Title: Open issues for skipping UL grants.

R2-163385; 3GPP TSG-RAN2 Meeting #94; Nanjing, China, May 23-27, 2016; Agenda item: 8.8.1; Source: FiberHome; Title: UL SPS command feedback.

R2-163386; 3GPP TSG-RAN WG2 Meeting #94; Nanjing, China, May 23-27, 2016; Agenda Item: 8.8.2; Souce: FiberHome; Title: discussion of retransmission for short SPS period.

R2-163475; 3GPP TSG RAN WG2 Meeting #94; Nanjing, China, May 23-27, 2016; Source: CATT; Title: Feedback for SPS activation and deactivation.

R2-163671; 3GPP TSG-RAN WG2 Meeting #94; May 23-27, 2016, Nanjing, China; Agenda Item: 8.8.1; Source: Samsung; Title: Feedback for SPS activation/deactivation.

R2-163698; 3GPP TSG-RAN WG2 Meeting #94; Nanjing, China, May 23-27, 2016; Agenda item: 8.8.1; Source: Nokia, Alcatel-Lucent Shanghai Bell; Title: Feedback for SPS activation/deactivation.

R2-163771; 3GPP TSG-RAN WG2 Meeting #94; Nanjing, China, May 23-27, 2016; Agenda Item: 8.8.2; Source: Fujitsu; Title: Considerations on the SPS resource efficiency.

R2-163781; 3GPP TSG-RAN WG2 #94; Nanjing, China, May 23-27, 2016; Agenda Item: 8.8.1; Source: Ericsson; Title: Acknowledgements for SPS commands.

R2-163916; 3GPP TSG-RAN WG2 Meeting #94; Nanjing, China, May 23-27, 2016; Agenda item: 8.8.1; Source: Huawei, HiSilicon; Title: Discussion on feedback for SPS activation and deactivation.

R2-163917; 3GPP TSG-RAN WG2 Meeting #94; Nanjing, China, May 23-27, 2016; Agenda Item: 8.8.2; Source: Huawei, HiSilicon; Title: Implicit SPS release under UL grants skipping.

(56) References Cited

OTHER PUBLICATIONS

R2-164207; 3GPP TSG-RAN WG2 Meeting #94; Nanjing, China, May 23-27, 2016; Agenda Item: 8.8.1 (LTE_LATRED_L2-Core); Source: LG Electronics Inc.; Title: SPS feedback for SPS release.
R2-164217; 3GPP TSG-RAN WG2 Meeting #94; Nanjing, China, May 23-27, 2016; Agenda Item: 8.8.1 (LTE_LATRED_L2-Core); Source: LG Electronics Inc.; Title: Need of feedback for SPS activation.
R2-165266; 3GPP TSG-RAN2 Meeting #95; Goteborg, Sweden, Aug. 22-26, 2016; Source: ZTE Corporation; Title: Discussion on the configurable feedback.
R2-165267; 3GPP TSG-RAN2 Meeting #95; Goteborg, Sweden, Aug. 22-26, 2016; Source: ZTE Corporation; Title: Discussion on the feedback transmission of SPS release.
R2-165354; 3GPP TSG-RAN WG2 #95; Gothenburg, Sweden, May 22-26, 2016; Agenda Item: 8.8; Source: Ericsson; Title: Remaining issues with SPS with skip padding and short periods.
R2-165663; 3GPP TSG-RAN WG2 Meeting #95; Gothenburg, Sweden, Aug. 22-26, 2016; Agenda Item: 8.8 (LTE_LATRED_L2-Core); Source: LG Electronics Inc.; Title: Remaining issues on SPS Confirmation MAC CE.
R2-165686; 3GPP TSG-RAN2 Meeting #95; Gothenburg, Sweden, Aug. 22-26, 2016; Agenda item: 8.8; Source: Qualcomm Incorporated; Title: Remaining Open Issues for Uplink Skipping.
3GPP TS 36.423 V14.0.0 (Sep. 2016); Technical Specification; 3rd Generation Partnership Project; Technical Specification Group Radio Access Network; Evolved Universal Terrestrial Radio Access Network (E-UTRAN); X2 application protocol (X2AP) (Release 14).
R2-167409; 3GPP TSG RAN WG2 Meeting #96; Reno, USA, Nov. 14-18, 2016; 3GPP TSG RAN WG1 Meeting #86bis; R1-1610929; Lisboa, Portugal, Oct. 10-14, 2016; Title: LS response on DFN offset.
R2-167481; 3GPP TSG-RAN2 Meeting #96; Reno, USA, Nov. 14-18, 2016; Agenda Item: 8.13.2; Source: OPPO; Title: Discussion on Remain Issues of V2X SPS Enhancements.
R2-167482; 3GPP TSG-RAN2 Meeting #96; Reno, USA, Nov. 14-18, 2016; Agenda Item: 8.13.3; Source: OPPO; Title: Discussion on V2P.
R2-167567; 3GPP TSG-RAN WG2 #96; Reno, USA, Nov. 14-18, 2016; Agenda item: 8.13.2; Source: Samsung, Intel; Title: Handling Sidelink SPS Configurations.
R2-167889; 3GPP TSG-RAN WG2 Meeting #96; Reno, USA, Nov. 14-18, 2016; Agenda item: 8.13.2; Source: Qualcomm Incorporated; Title: SPS enhancement for V2X.
R2-167890; 3GPP TSG-RAN WG2 Meeting #96; Reno, USA, Nov. 14-18, 2016; Agenda item: 8.13.3; Source: Qualcomm Incorporated; Title: Sensing based resource selection for V2P.
R2-167919; 3GPP TSG RAN WG2 #96; Reno, USA, Nov. 14-18, 2016; Agenda Item: 8.13.3; Souce: Samsung; Title: Discussion about prioritization of P-UEs.

\* cited by examiner

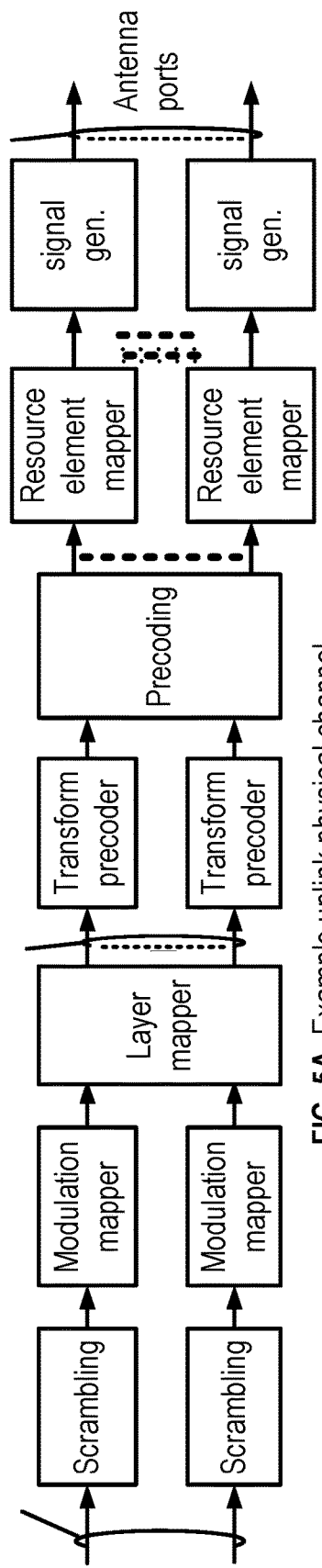
FIG. 5A Example uplink physical channel
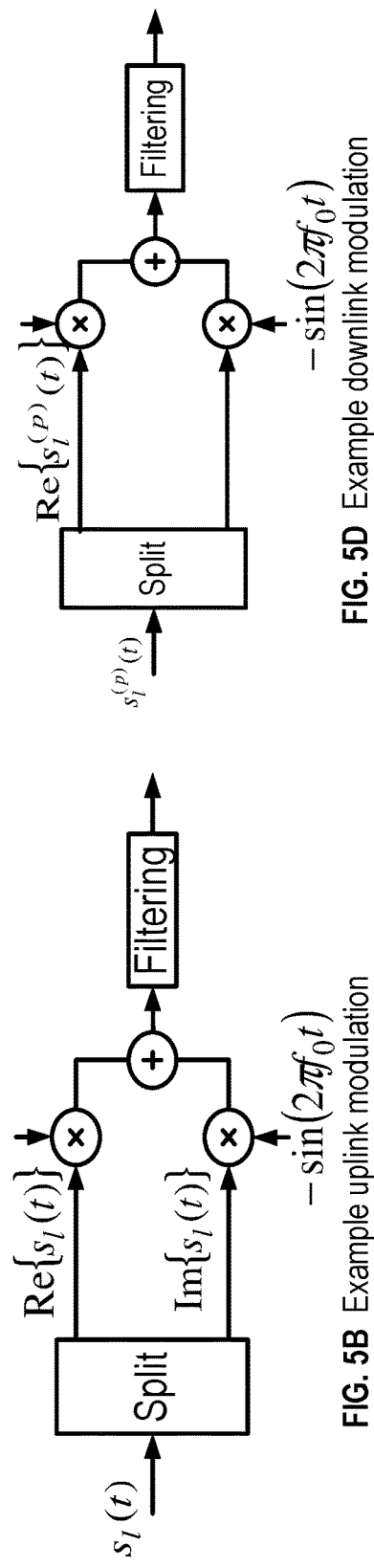
FIG. 5B Example uplink modulation
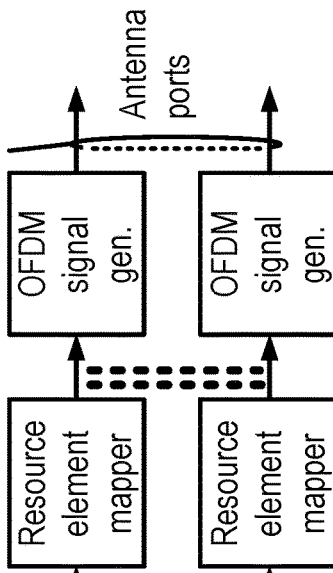
FIG. 5D Example downlink modulation
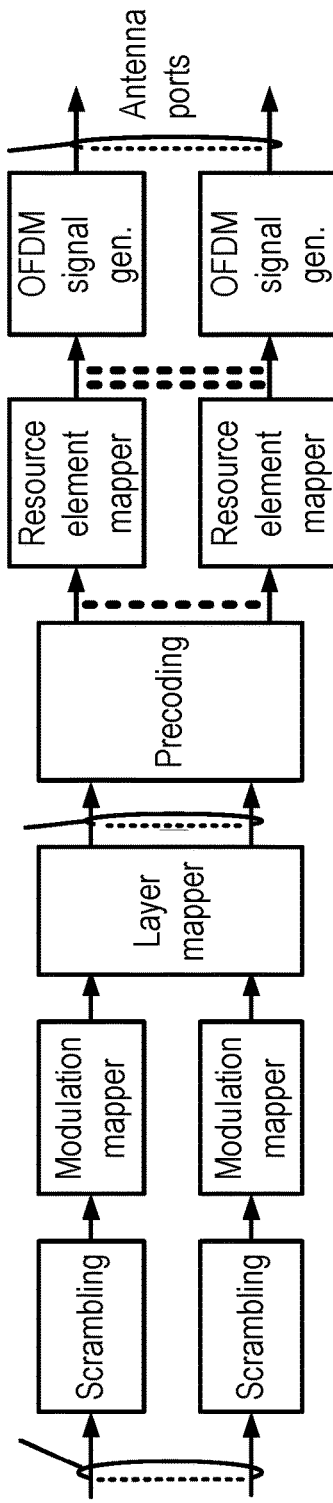
FIG. 5C Example downlink physical channel Dual-Connectivity at eNB Dual-Connectivity- two MAC entities at UE side

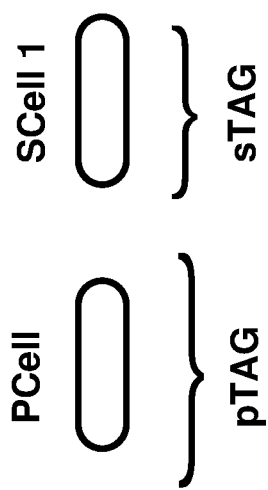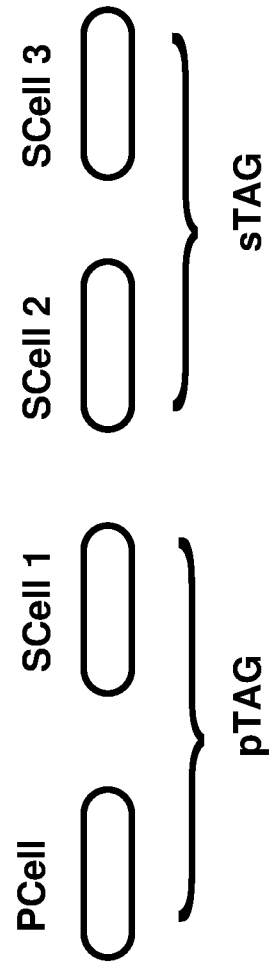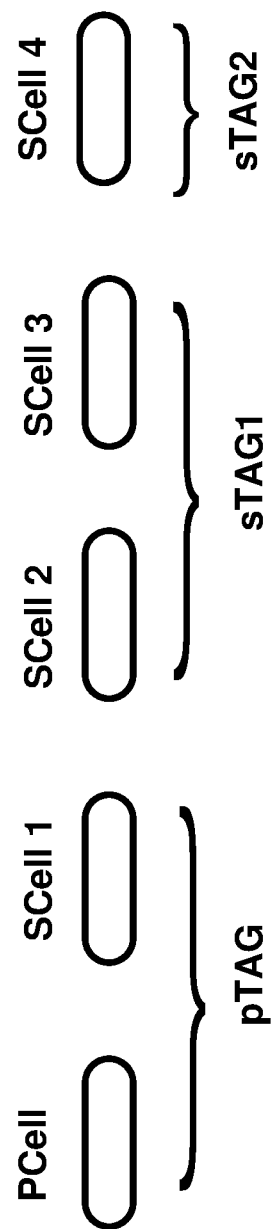
FIG. 8

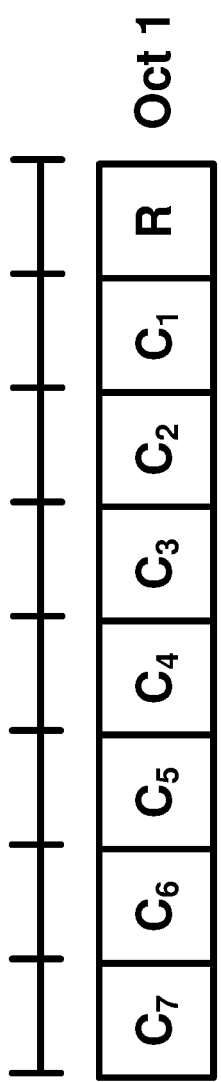
Example Activation/Deactivation MAC control element of one octet
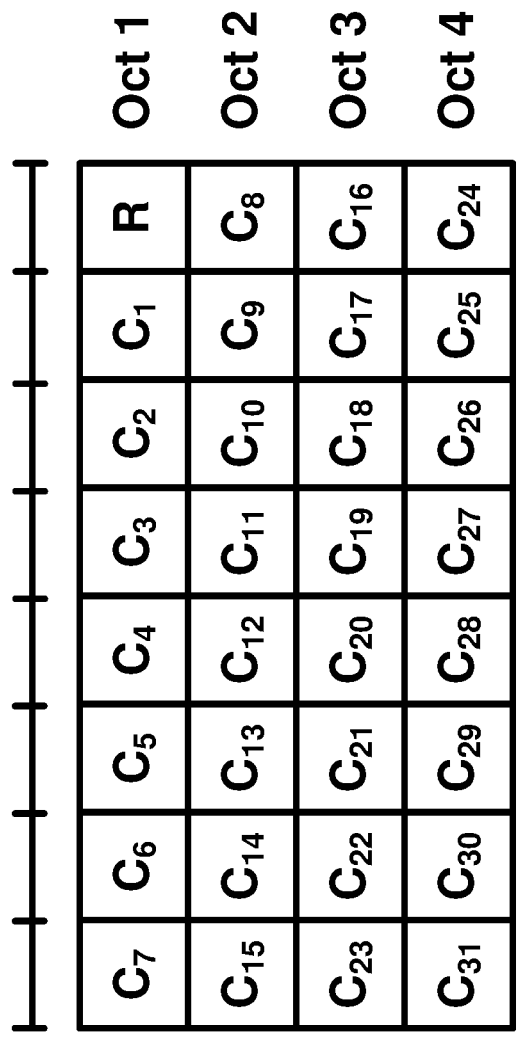
Example Activation/Deactivation MAC control element of four octets
FIG. 10

| TDD UL/DL configuration | Position of Initial Semi-Persistent grant | Subframe_Offset value (ms) |
|---|---|---|
| 0 | N/A | 0 |
| 1 | Subframes 2 and 7 | 1 |
| 1 | Subframes 3 and 8 | -1 |
| 2 | Subframe 2 | 5 |
| 2 | Subframe 7 | -5 |
| 3 | Subframes 2 and 3 | 1 |
| 3 | Subframe 4 | -2 |
| 4 | Subframe 2 | -1 |
| 4 | Subframe 3 | -1 |
| 5 | N/A | 0 |
| 6 | N/A | 0 |

FIG. 11

| TPC Command Field in DCI format 3 | Accumulated $\delta_{PUSCH,c}$ [dB] |
|---|---|
| 0 | -1 |
| 1 | 0 |
| 2 | 1 |
| 3 | 3 |

FIG. 13

| TPC Command Field in DCI format 3A | Accumulated $\delta_{PUSCH,c}$ [dB] |
|---|---|
| 0 | -1 |
| 1 | 1 |

FIG. 14

| DCI format | Search Space |
|---|---|
| DCI format 3/3A | Common |

FIG. 15

| DCI format | Search Space |
|---|---|
| DCI format 3/3A | Type0-Common (for CEModeA) |

FIG. 16

| DCI format | Search Space |
|---|---|
| DCI format 3/3A | Type0-Common (for CEModeA only) |

FIG. 17

GROUP POWER CONTROL FOR A SECONDARY CELL

CROSS-REFERENCE TO RELATED APPLICATIONS

This application claims the benefit of U.S. Provisional Application No. 62/372,120, filed Aug. 8, 2016, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 10 is an example diagram depicting Activation/Deactivation MAC control elements as per an aspect of an embodiment of the present disclosure.

FIG. 11 is an example diagram depicting example subframe offset values as per an aspect of an embodiment of the present disclosure.

FIG. 13 is an example power control command mapping as per an aspect of an embodiment of the present disclosure.

FIG. 14 is an example power control command mapping as per an aspect of an embodiment of the present disclosure.

FIG. 15 is an example mapping between DCI format and search space as per an aspect of an embodiment of the present disclosure.

FIG. 16 is an example mapping between DCI format and search space as per an aspect of an embodiment of the present disclosure.

FIG. 17 is an example mapping between DCI format and search space as per an aspect of an embodiment of the present disclosure.

DETAILED DESCRIPTION OF EMBODIMENTS

Figure 1:
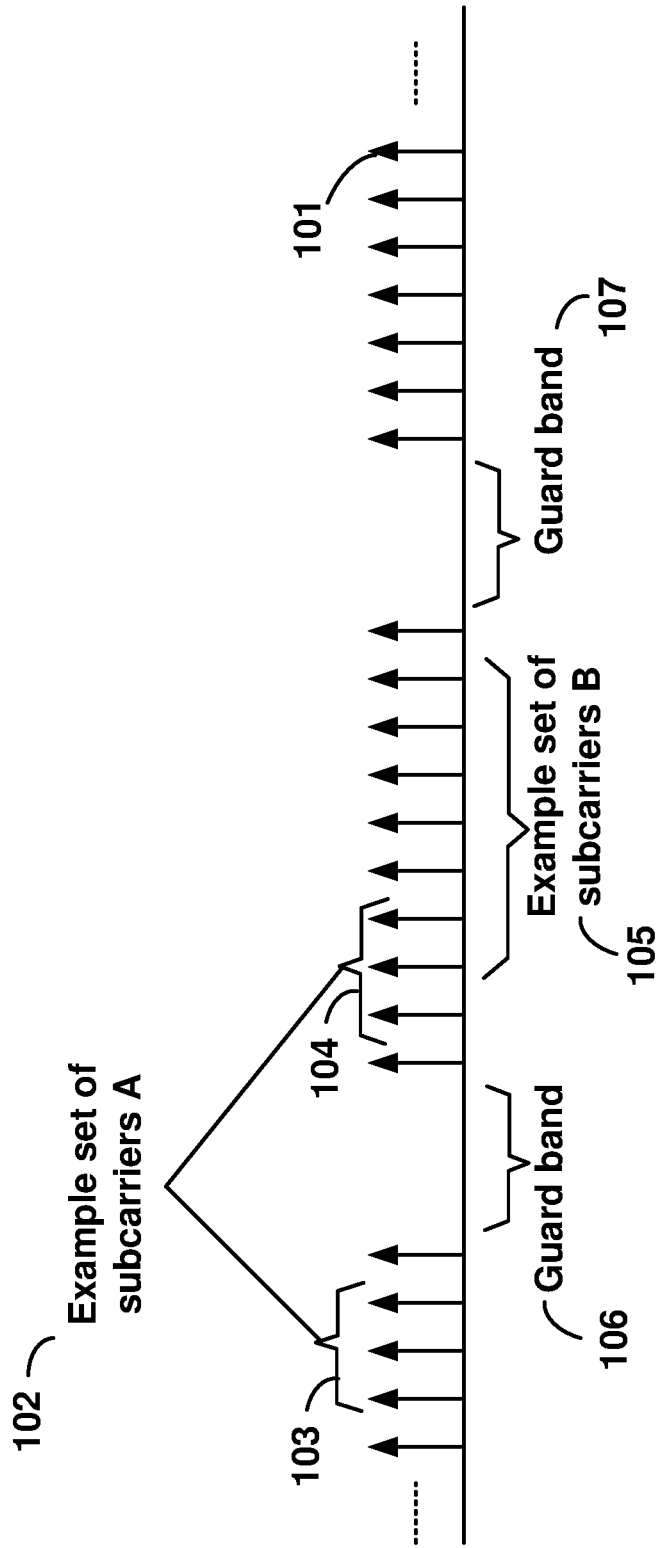
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
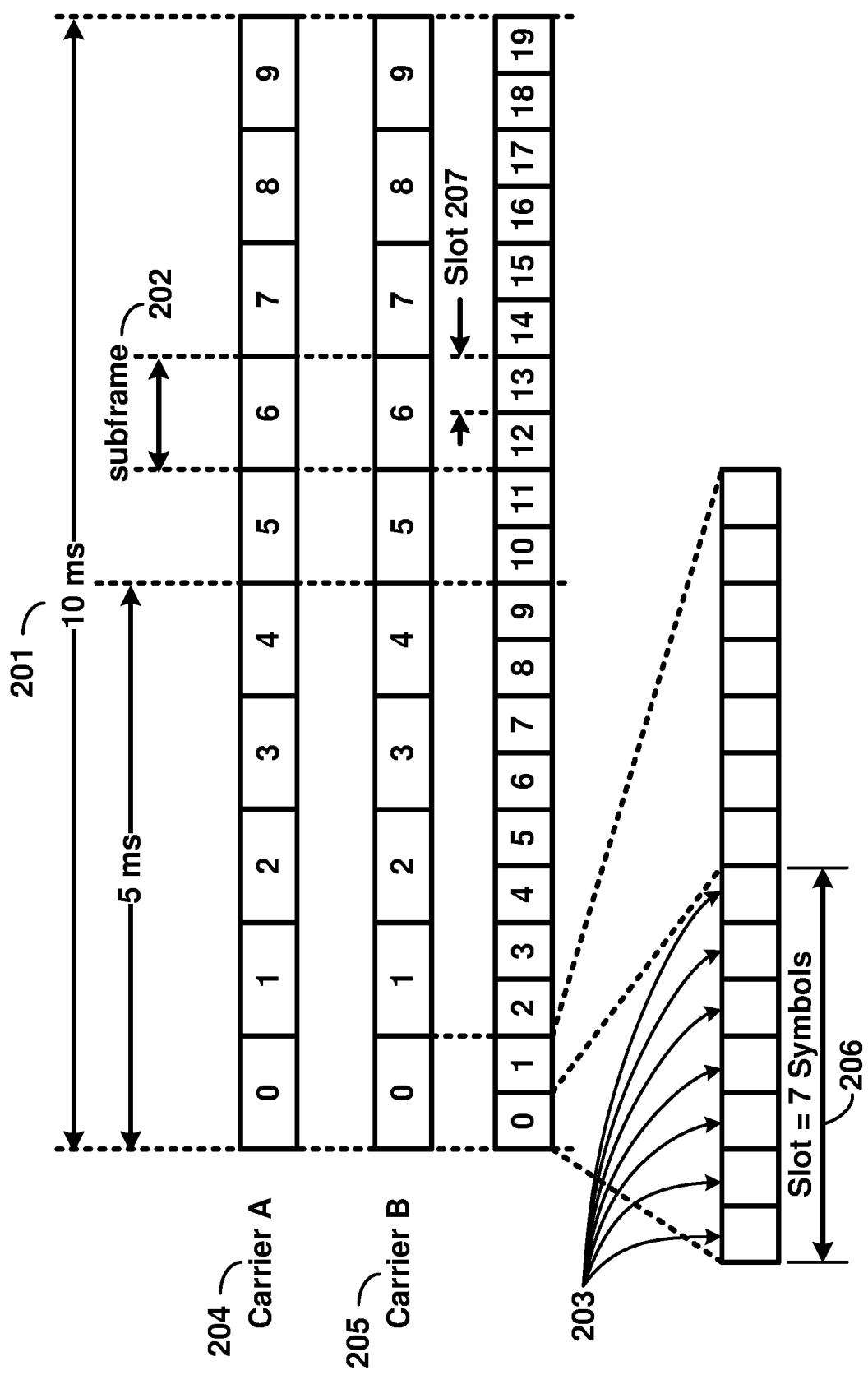
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
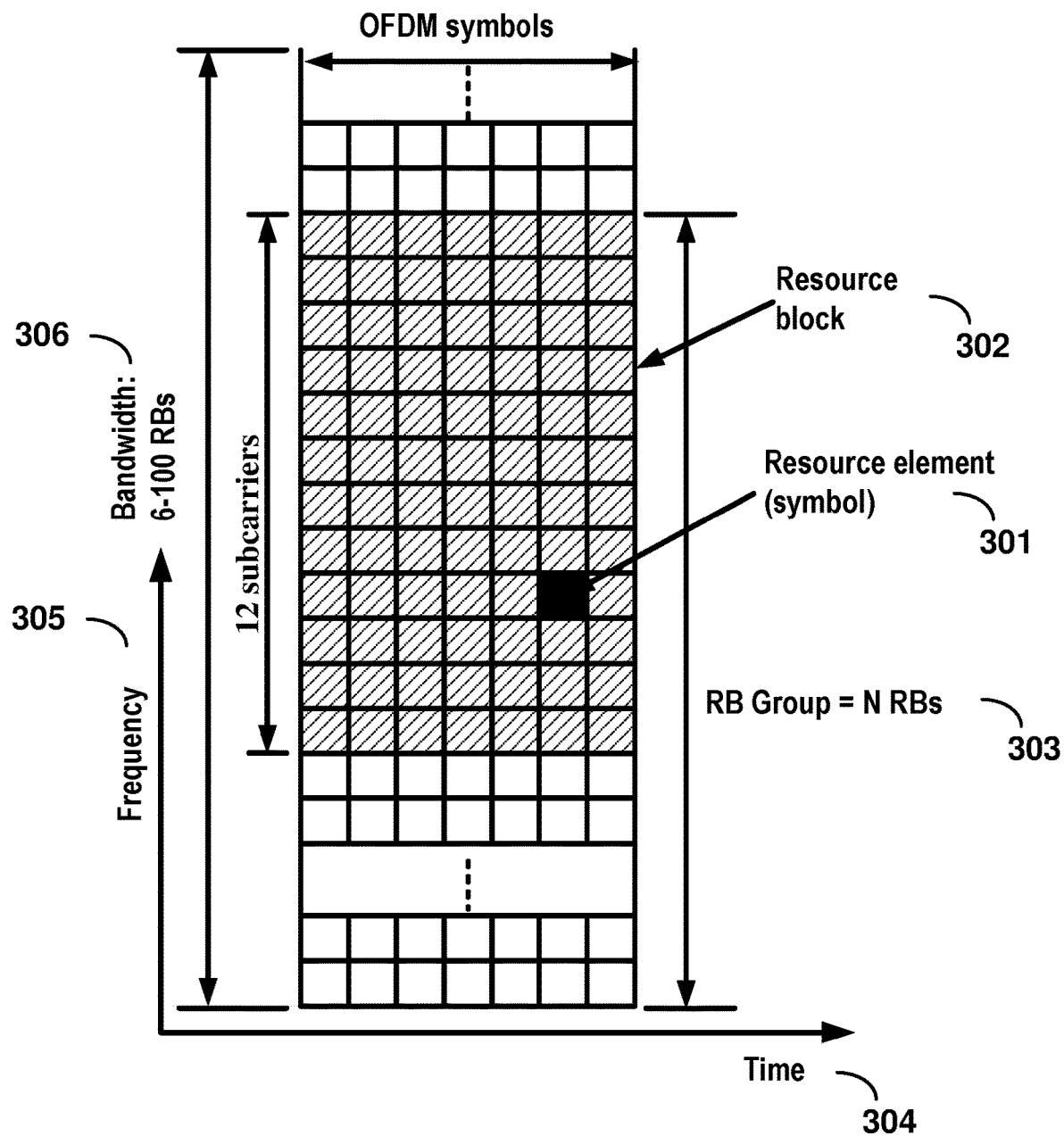
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
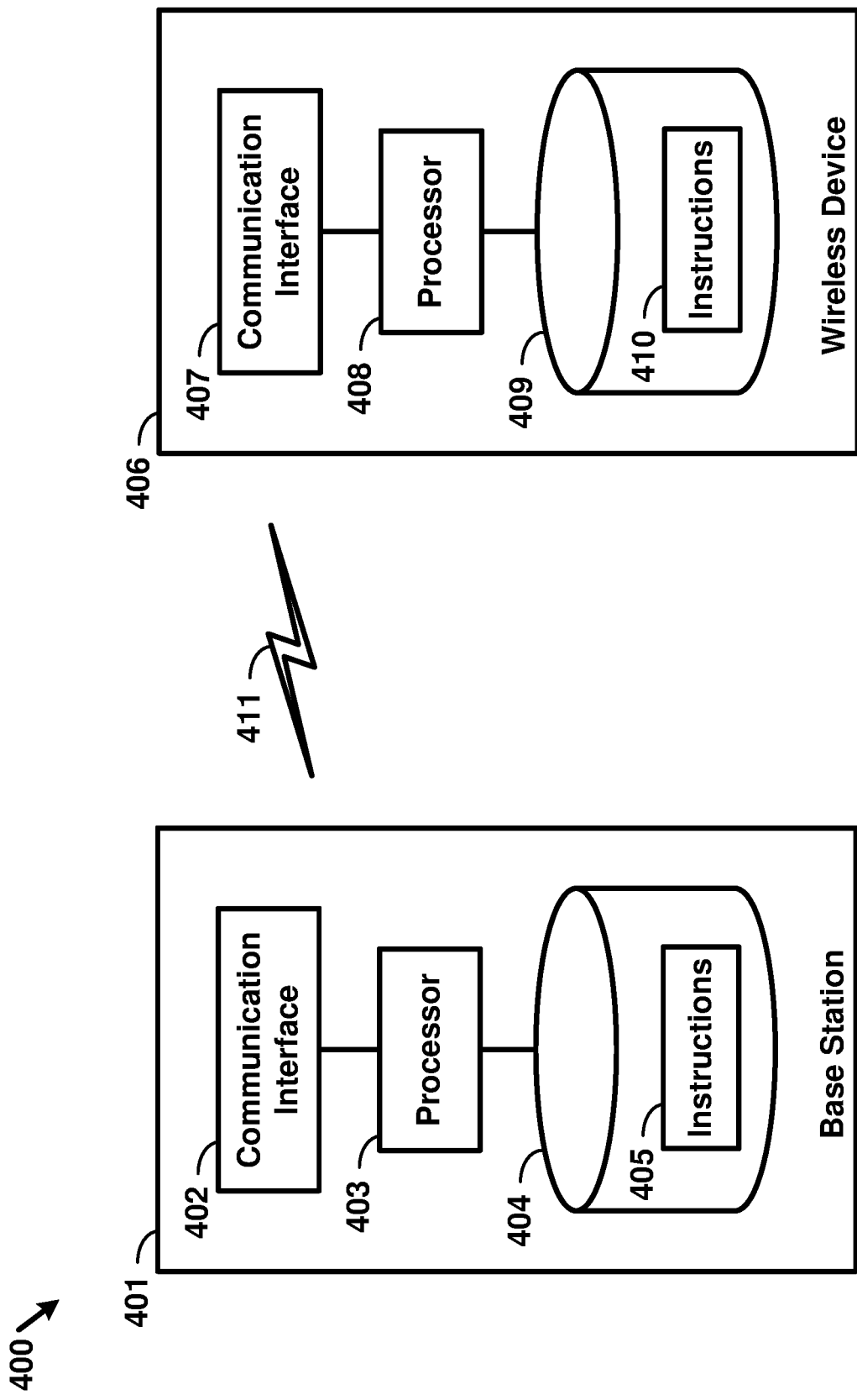
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
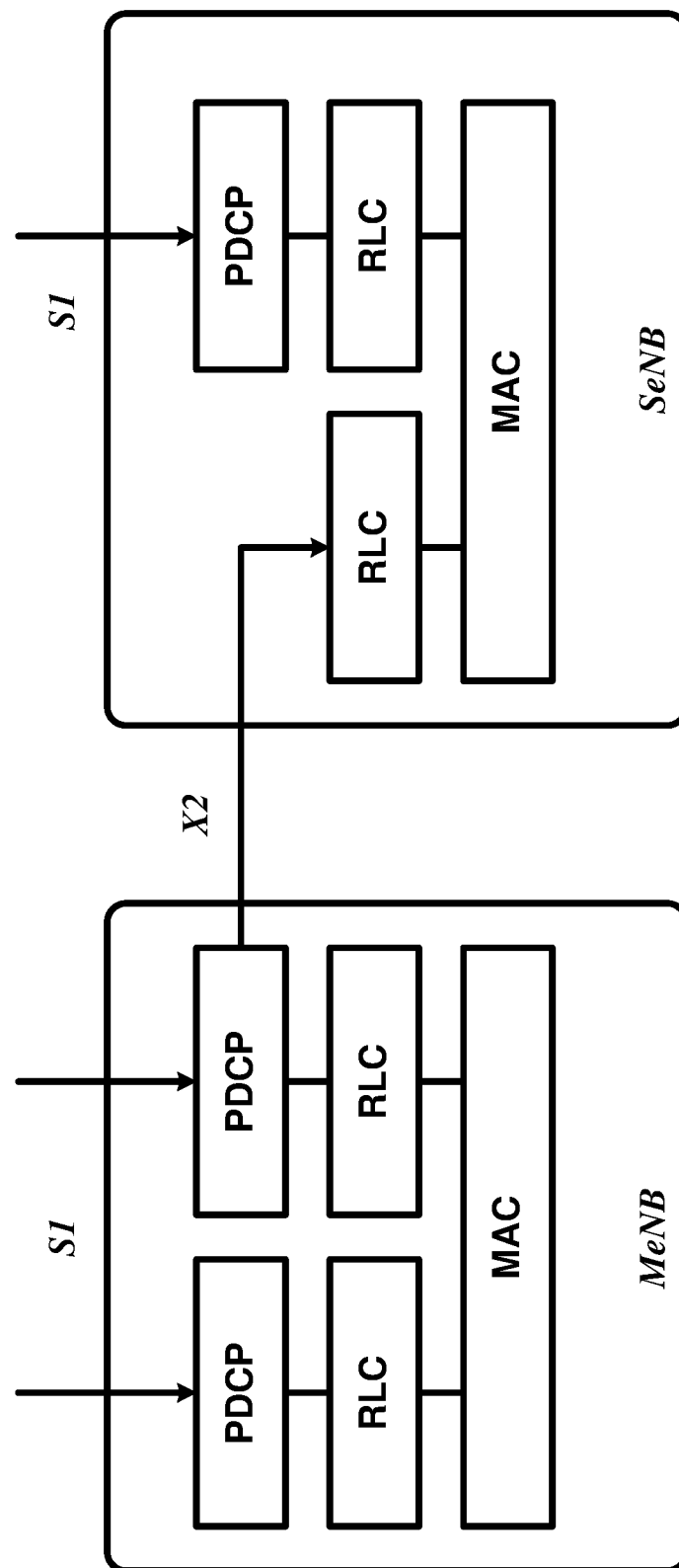
FIG. 6 is an example diagram for a protocol structure with CA and DC as per an aspect of an embodiment of the present disclosure.
Figure 7:
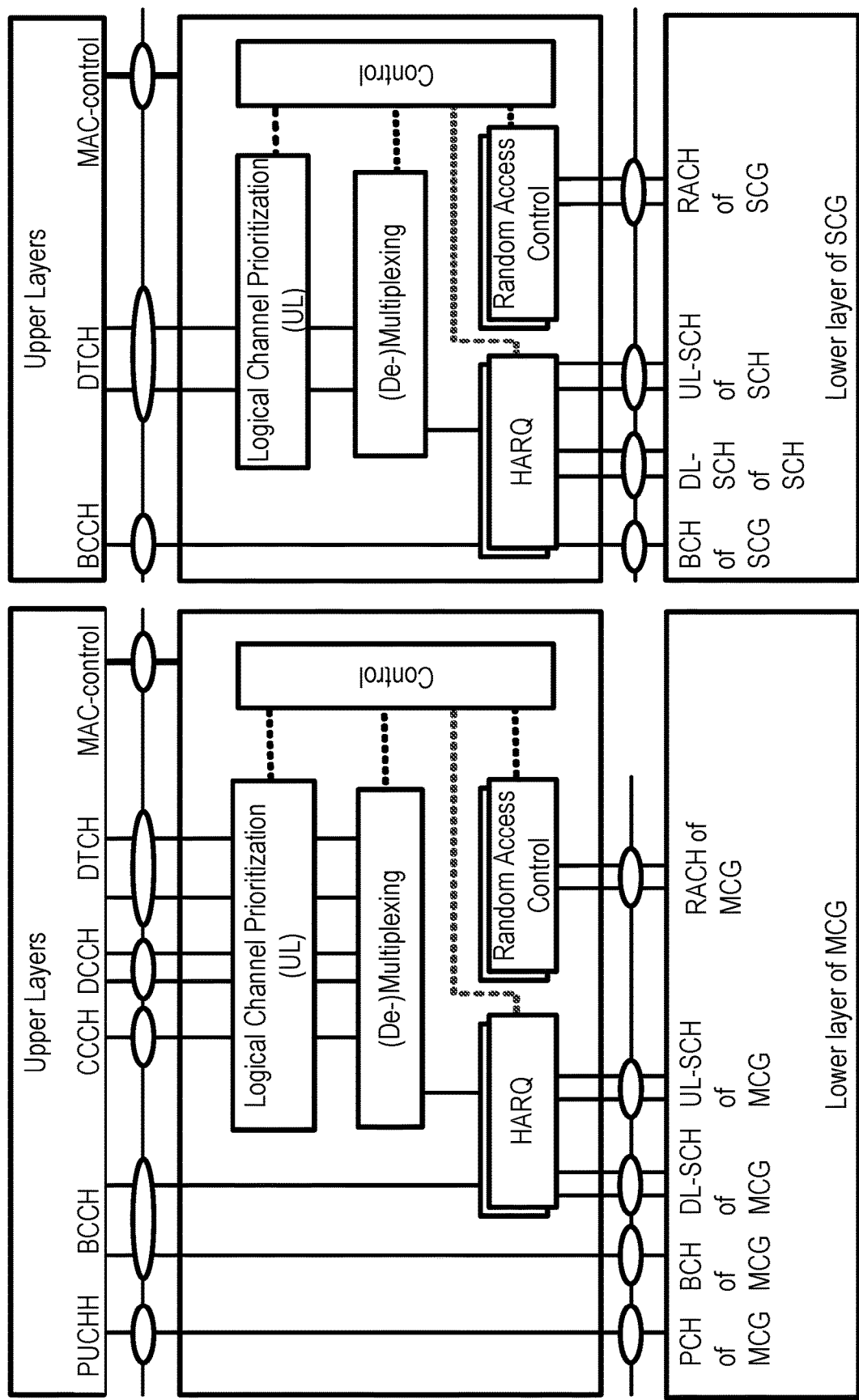
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
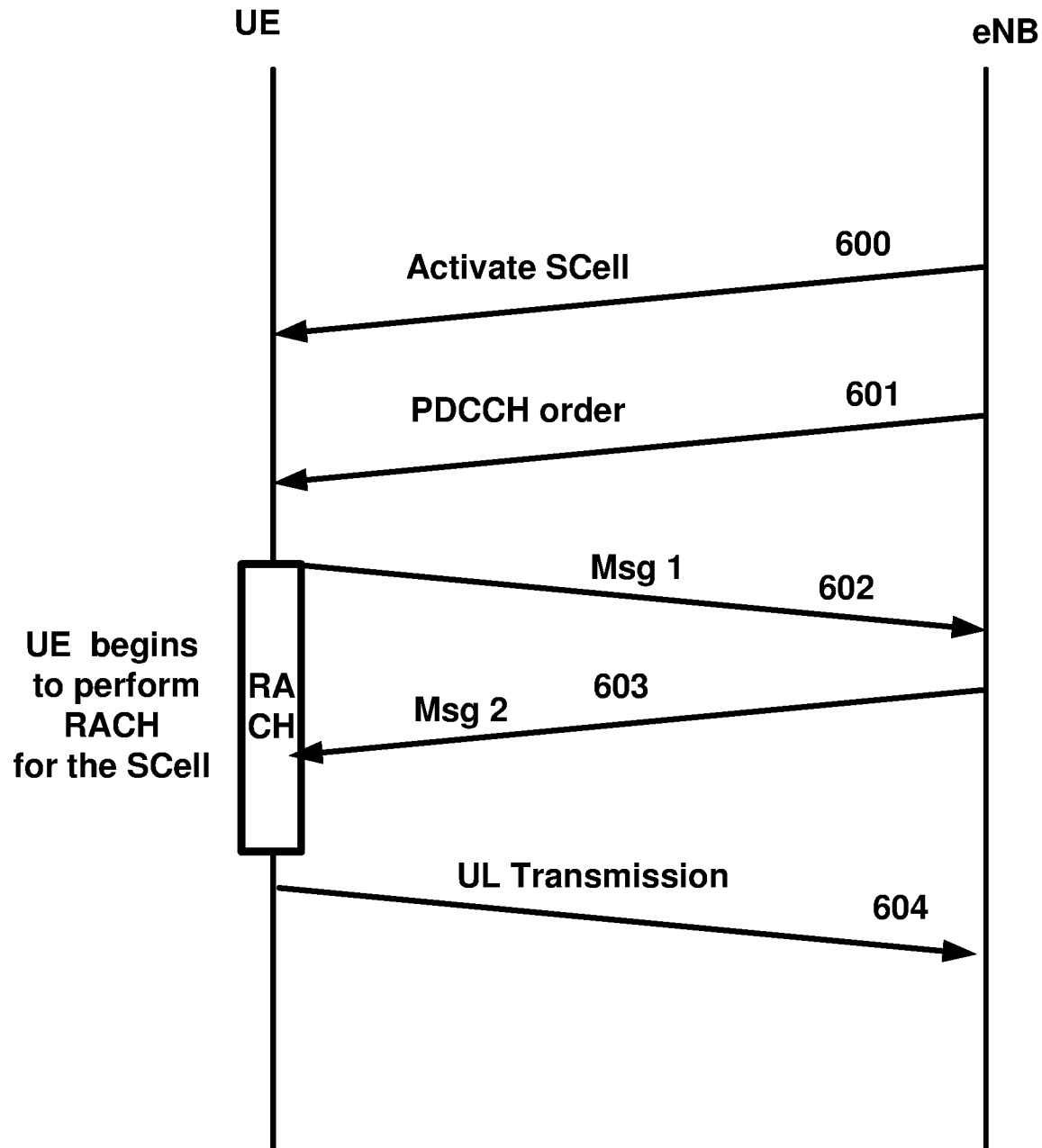
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/orif the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

In an example, the MAC entity may be configured with one or more SCells. In an example, the network may activate and/or deactivate the configured SCells. The SpCell may always be activated. The network may activate and deactivates the SCell(s) by sending the Activation/Deactivation MAC control element. The MAC entity may maintain a sCellDeactivationTimer timer for a configured SCell. Upon the expiry of sCellDeactivationTimer timer, the MAC entity may deactivate the associated SCell. In an example, the same initial timer value may apply to each instance of the sCellDeactivationTimer and it may be configured by RRC. The configured SCells may initially be deactivated upon addition and after a handover. The configured SCG SCells may initially be deactivated after a SCG change.

In an example, if the MAC entity receives an Activation/Deactivation MAC control element in a TTI activating a SCell, the MAC entity may, in a TTI according to the timing defined below, activate the SCell and apply normal SCell operation including SRS transmissions on the SCell, CQI/PMI/RI/PTI/CRI reporting for the SCell, PDCCH monitoring on the SCell, PDCCH monitoring for the SCell and PUCCH transmissions on the SCell, if configured. The MAC entity may start or restart the sCellDeactivationTimer associated with the SCell and trigger power headroom report (PHR). In an example, if the MAC entity receives an Activation/Deactivation MAC control element in a TTI deactivating a SCell or if the sCellDeactivationTimer associated with an activated SCell expires in the TTI, the MAC entity may, in a TTI according to the timing defined below, deactivate the SCell, stop the sCellDeactivationTimer associated with the SCell and flush all HARQ buffers associated with the SCell.

In an example, when a UE receives an activation command for a secondary cell in subframe n, the corresponding actions above may be applied no later than the minimum requirements and no earlier than subframe n+8, except for the actions related to CSI reporting on a serving cell which may be active in subframe n+8 and the actions related to the sCellDeactivationTimer associated with the secondary cell which may be applied in subframe n+8. The actions related to CSI reporting on a serving cell which is not active in subframe n+8 may be applied in the earliest subframe after n+8 in which the serving cell is active.

In an example, when a UE receives a deactivation command for a secondary cell or the sCellDeactivationTimer associated with the secondary cell expires in subframe n, the corresponding actions above may apply no later than the minimum requirement except for the actions related to CSI reporting on a serving cell which is active which may be applied in subframe n+8.

In an example, if the PDCCH on the activated SCell indicates an uplink grant or downlink assignment or if the PDCCH on the Serving Cell scheduling an activated SCell indicates an uplink grant or a downlink assignment for the activated SCell, the MAC entity may restart the sCellDeactivationTimer associated with the SCell.

In an example, if a SCell is deactivated, the UE may not transmit SRS on the SCell, may not report CQI/PMI/RI/PTI/CRI for the SCell, may not transmit on UL-SCH on the SCell, may not transmit on RACH on the SCell, may not monitor the PDCCH on the SCell, may not monitor the PDCCH for the SCell and may not transmit PUCCH on the SCell.

In an example, the HARQ feedback for the MAC PDU containing Activation/Deactivation MAC control element may not be impacted by PCell interruption due to SCell activation/deactivation. In an example, when SCell is deactivated, the ongoing Random Access procedure on the SCell, if any, may be aborted.

In an example, the Activation/Deactivation MAC control element of one octet may be identified by a MAC PDU subheader with LCID 11000. FIG. 10 shows example Activation/Deactivation MAC control elements. The Activation/Deactivation MAC control element may have a fixed size and may consist of a single octet containing seven C-fields and one R-field. Example Activation/Deactivation MAC control element with one octet is shown in FIG. 10. The Activation/Deactivation MAC control element may have a fixed size and may consist of four octets containing 31 C-fields and one R-field. Example Activation/Deactivation MAC control element of four octets is shown in FIG. 10. In an example, for the case with no serving cell with a serving cell index (ServCellIndex) larger than 7, Activation/Deactivation MAC control element of one octet may be applied, otherwise Activation/Deactivation MAC control element of four octets may be applied. The fields in an Activation/Deactivation MAC control element may be interpreted as follows. Ci: if there is an SCell configured with SCellIndex i, this field may indicate the activation/deactivation status of the SCell with SCellIndex i, else the MAC entity may ignore the Ci field. The Ci field may be set to "1" to indicate that the SCell with SCellIndex i is activated. The Ci field is set to "0" to indicate that the SCell with SCellIndex i is deactivated. R: Reserved bit, set to "0".

Figure 12:
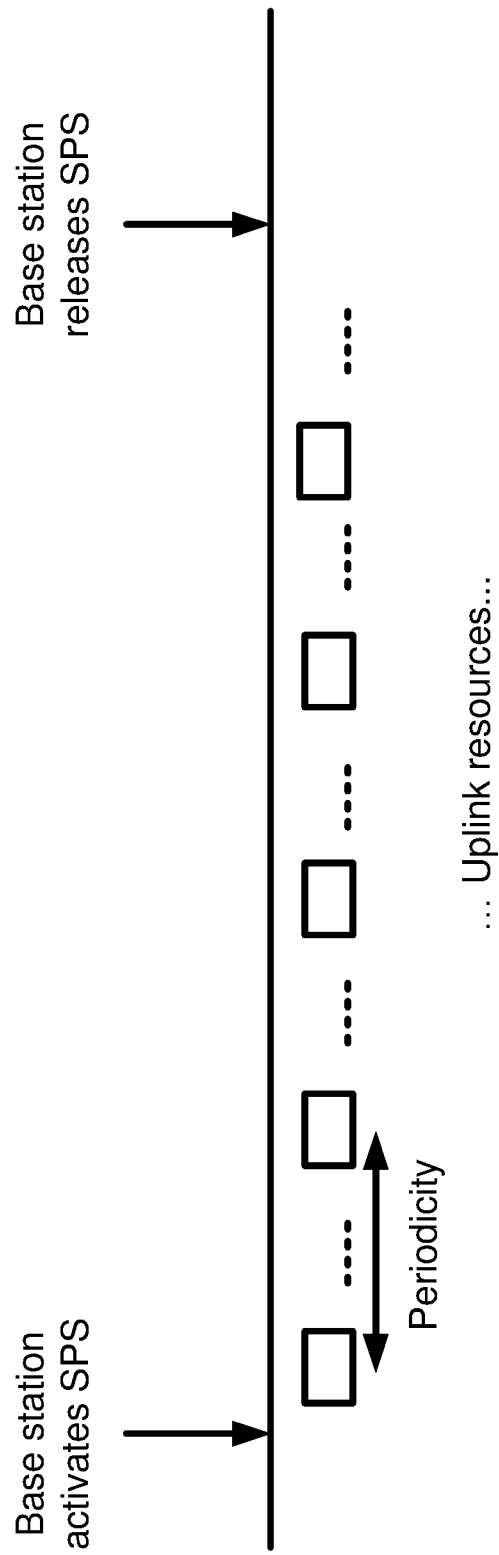
FIG. 12 is an example diagram depicting example uplink SPS activation and release as per an aspect of an embodiment of the present disclosure.

A base station may provide a periodic resource allocation. In a periodic resource allocation, an RRC message and/or a DCI may activate or release a periodic resource allocation. The UE may be allocated in downlink and/or uplink periodic radio resources without the need for transmission of additional grants by the base station. The periodic resource allocation may remain activated until it is released. The periodic resource allocation for example, may be called, semi-persistent scheduling or grant-free scheduling, or periodic multi-subframe scheduling, and/or the like. In this specification, the example term semi-persistent scheduling is mostly used, but other terms may also be equally used to refer to periodic resource allocation, e.g. grant-free scheduling. An example periodic resource allocation activation and release is shown in FIG. 12.

In the downlink, a base station may dynamically allocate resources (PRBs and MCS) to UEs at a TTI via the C-RNTI on PDCCH(s). A UE may monitor the PDCCH(s) in order to find possible allocation when its downlink reception is enabled (e.g. activity governed by DRX when configured). When CA is configured, the same C-RNTI applies to serving cells. Base station may also allocate semi-persistent downlink resources for the first HARQ transmissions to UEs. In an example, an RRC message may indicate the periodicity of the semi-persistent downlink grant. In an example, a PDCCH DCI may indicate whether the downlink grant is a semi-persistent one e.g. whether it can be implicitly reused in the following TTIs according to the periodicity defined by RRC.

In an example, when required, retransmissions may be explicitly signaled via the PDCCH(s). In the sub-frames where the UE has semi-persistent downlink resource, if the UE cannot find its C-RNTI on the PDCCH(s), a downlink transmission according to the semi-persistent allocation that the UE has been assigned in the TTI is assumed. Otherwise, in the sub-frames where the UE has semi-persistent downlink resource, if the UE finds its C-RNTI on the PDCCH(s), the PDCCH allocation may override the semi-persistent allocation for that TTI and the UE may not decode the semi-persistent resources.

When CA is configured, semi-persistent downlink resources may be configured for the PCell and/or SCell(s). In an example, PDCCH dynamic allocations for the PCell and/or SCell(s) may override the semi-persistent allocation.

In the uplink, a base station may dynamically allocate resources (PRBs and MCS) to UEs at a TTI via the C-RNTI on PDCCH(s). A UE may monitor the PDCCH(s) in order to find possible allocation for uplink transmission when its downlink reception is enabled (activity governed by DRX when configured). When CA is configured, the same C-RNTI applies to serving cells. In addition, a base station may allocate a semi-persistent uplink resource for the first HARQ transmissions and potentially retransmissions to UEs. In an example, an RRC may define the periodicity of the semi-persistent uplink grant. PDCCH may indicate whether the uplink grant is a semi-persistent one e.g. whether it can be implicitly reused in the following TTIs according to the periodicity defined by RRC.

In an example, in the sub-frames where the UE has semi-persistent uplink resource, if the UE cannot find its C-RNTI on the PDCCH(s), an uplink transmission according to the semi-persistent allocation that the UE has been assigned in the TTI may be made. The network may perform decoding of the pre-defined PRBs according to the pre-defined MCS. Otherwise, in the sub-frames where the UE has semi-persistent uplink resource, if the UE finds its C-RNTI on the PDCCH(s), the PDCCH allocation may override the persistent allocation for that TTI and the UE's transmission follows the PDCCH allocation, not the semi-persistent allocation. Retransmissions may be either implicitly allocated in which case the UE uses the semi-persistent uplink allocation, or explicitly allocated via PDCCH(s) in which case the UE does not follow the semi-persistent allocation.

Vehicular communication services, represented by V2X services, may comprise of the following different types: V2V, V2I, V2N and/or V2P. V2X services may be provided by PC5 interface (sidelink) and/or Uu interface (UE to base station interface). Support of V2X services via PC5 interface may be provided by V2X sidelink communication, which is a mode of communication whereby UEs may communicate with each other directly over the PC5 interface. This communication mode may be supported when the UE is served by E-UTRAN and when the UE is outside of E-UTRA coverage. The UEs authorized to be used for V2X services may perform V2X sidelink communication.

The user plane protocol stack and functions for sidelink communication may be used for V2X sidelink communication. In order to assist the eNB to provide sidelink resources, the UE in RRC_CONNECTED may report geographical location information to the eNB. The eNB may configure the UE to report the complete UE geographical location information based on periodic reporting via the existing measurement report signaling.

In an example, for V2X communication, k SPS (e.g. k=8 or 16, etc) configurations with different parameters may be configured by eNB and SPS configurations may be active at the same time. The activation/deactivation of an SPS configuration may signaled via a PDCCH DCI and/or an RRC message by eNB. The logical channel prioritization for Uu may be used.

For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation. For instance, the UE may be allowed to report the UE assistance information when change in estimated periodicity and/or timing offset of packet arrival occurs. For V2X communication via Uu, SR mask as per legacy mechanism may be used.

In an example, for unicast transmission of V2X messages, the V2X message may be delivered via Non-GBR bearers as well as GBR bearers. In order to meet the QoS requirement for V2X message delivery for V2X services, a Non-GBR QCI value and a GBR QCI value for V2X messages may be used. For broadcasting V2X messages, SC-PTM or MBSFN transmission may be used. In order to reduce SC-PTM/MBSFN latency, shorter (SC-)MCCH repetition period for SC-PTM/MBSFN, modification period for SC-PTM/MBSFN and MCH scheduling period for MBSFN may be supported. Reception of downlink broadcast of V2X messages in different carriers/PLMNs may be supported by having multiple receiver chains in the UE.

In an example embodiment, various DCI formats may be used for SPS scheduling. For example, the DCI format 0 may be used for uplink SPS. In an example, the fields for DCI format 0 may comprise one or more of the following fields: Carrier indicator e.g. 0 or 3 bits. Flag for format0/format1A differentiation e.g. 1 bit, where value 0 may indicate format 0 and value 1 may indicate format 1A. Frequency hopping flag, e.g. 1 bit. This field may be used as the MSB of the corresponding resource allocation field for resource allocation type 1. Resource block assignment and hopping resource allocation, e.g. $\lceil \log_2 (N_{RB}^{UL}(N_{RB}^{UL}+1)/2) \rceil$ bits where $N_{RB}^{UL}$ may be the uplink bandwidth configuration in number of resource blocks. Modulation and coding scheme and redundancy version e.g. 5 bits. New data indicator e.g. 1 bit. TPC command for scheduled PUSCH e.g. 2 bits. Cyclic shift for DM RS and OCC index e.g. 3 bits. UL index e.g. 2 bits (this field may be present for TDD operation with uplink-downlink configuration 0). Downlink Assignment Index (DAI) e.g. 2 bits (this field may be present for cases with TDD primary cell and either TDD operation with uplink-downlink configurations 1-6 or FDD operation). CSI request e.g. 1, 2 or 3 bits. The 2-bit field may apply to UEs configured with no more than five DL cells and to UEs that are configured with more than one DL cell and when the corresponding DCI format is mapped onto the UE specific search space given by the C-RNTI, UEs that are configured by higher layers with more than one CSI process and when the corresponding DCI format is mapped onto the UE specific search space given by the C-RNTI, UEs that are configured with two CSI measurement sets by higher layers with the parameter csi-MeasSubframeSet, and when the corresponding DCI format is mapped onto the UE specific search space given by the C-RNTI; the 3-bit field may apply to the UEs that are configured with more than five DL cells and when the corresponding DCI format is mapped onto the UE specific search space given by the C-RNTI; otherwise the 1-bit field may apply. SRS request e.g. 0 or 1 bit. This field may be present in DCI formats scheduling PUSCH which are mapped onto the UE specific search space given by the C-RNTI. Resource allocation type e.g. 1 bit. This field may be present if $N_{RB}^{UL} \le N_{RB}^{UL}$ where $N_{RB}^{UL}$ may be the uplink bandwidth configuration in number of resource blocks and $N_{RB}^{UL}$ may be the downlink bandwidth configuration in number of resource blocks. In example, one or more fields may be added to a DCI for SPS to enhance SPS scheduling process. In example, one or more of the fields may be replaced with new fields, or new values, or may be interpreted differently for SPS to enhance SPS scheduling process.

A base station may transmit one or more RRC messages to a wireless device to configure SPS. The one or more RRC messages may comprise SPS configuration parameters. Example SPS configuration parameters are presented below. In example, one or more parameters may be added to an RRC message for SPS to enhance SPS scheduling process. In example, one or more some of the parameters for an SPS in an RRC message may be replaced with new parameters, or new values, or may be interpreted differently for SPS to enhance SPS scheduling process. In an example, IE SPS-Config may be used by RRC to specify the semi-persistent scheduling configuration. In an example, the IE SPS-Config may be SEQUENCE {semiPersistSchedC-RNTI: C-RNTI; sps-ConfigDL: SPS-ConfigDL; sps-ConfigUL: SPS-ConfigUL}. SPS-ConfigDL IE may comprise semiPersistSched-IntervalDL, numberOfConfSPS-Processes, n1PUCCH-AN-PersistentList, twoAntennaPortActivated, n1PUCCH-AN-PersistentListP1, and/or other parameters. In an example, SPS-ConfigUL IE may comprise semiPersistSchedIntervalUL, implicitReleaseAfter, p0-NominalPUSCH-Persistent, p0-UE-PUSCH-Persistent, twoIntervalsConfig, p0-PersistentSubframeSet2, p0-NominalPUSCH-PersistentSubframeSet2, p0-UE-PUSCH- and/or PersistentSubframeSet2, and/or other parameters.

In an example, one or more RRC configuration parameters may comprise one or more of the following parameters to configure SPS for a wireless device. In an example, SPS configuration may include MCS employed for packet transmission of an MCS grant. In an example, implicitReleaseAfter IE may be the number of empty transmissions before implicit release, e.g. value e2 may corresponds to 2 transmissions, e3 may correspond to 3 transmissions and so on. In an example, n1PUCCH-AN-PersistentList IE, n1PUCCH-AN-PersistentListP1 IE may be the List of parameter: $n_{PUCCH}^{(1,p)}$ for antenna port P0 and for antenna port P1 respectively. Field n1-PUCCH-AN-PersistentListP1 IE may be applicable if the twoAntennaPortActivated-PUCCH-Format1a1b in PUCCH-ConfigDedicated-v1020 is set to true. Otherwise the field may not be configured.

In an example, numberOfConfSPS-Processes IE may be the number of configured HARQ processes for Semi-Persistent Scheduling. In an example, p0-NominalPUSCH-Persistent IE may be the parameter: $P_{O\_NOMINAL\_PUSCH}(0)$ used in PUSCH power control with unit in dBm and step 1. This field may be applicable for persistent scheduling. If choice setup is used and p0-Persistent is absent, the value of p0-NominalPUSCH for p0-NominalPUSCH-Persistent may be applied. If uplink power control subframe sets are configured by tpc-SubframeSet, this field may apply for uplink power control subframe set 1.

In an example, p0-NominalPUSCH-PersistentSubframeSet2 IE may be the parameter: $P_{O\_NOMINAL\_PUSCH}(0)$ used in PUSCH power control with unit in dBm and step 1. This field may be applicable for persistent scheduling. If p0-PersistentSubframeSet2-r12 is not configured, the value of p0-NominalPUSCH-SubframeSet2-r12 may be applied for p0-NominalPUSCH-PersistentSubframeSet2. E-UTRAN may configure this field if uplink power control subframe sets are configured by tpc-SubframeSet, in which case this field may apply for uplink power control subframe set 2. In an example, p0-UE-PUSCH-Persistent IE may be the parameter: $P_{O\_UE\_PUSCH}(0)$ used in PUSCH power control with unit in dB. This field may be applicable for persistent scheduling. If choice setup is used and p0-Persistent is absent, the value of p0-UE-PUSCH may be applied for p0-UE-PUSCH-Persistent. If uplink power control subframe sets are configured by tpc-SubframeSet, this field may be applied for uplink power control subframe set 1. In an example, p0-UE-PUSCH-PersistentSubframeSet2 IE may be the parameter: $P_{O\_UE\_PUSCH}(0)$ used in PUSCH power control with unit in dB. This field may be applicable for persistent scheduling. If p0-PersistentSubframeSet2-r12 is not configured, the value of p0-UE-PUSCH-SubframeSet2 may be applied for p0-UE-PUSCH-PersistentSubframeSet2. E-UTRAN may configure this field if uplink power control subframe sets are configured by tpc-SubframeSet, in which case this field may apply for uplink power control subframe set 2.

In an example, semiPersistSchedC-RNTI IE may be Semi-Persistent Scheduling C-RNTI. In an example, semiPersistSchedIntervalDL IE may be Semi-persistent scheduling interval in downlink. Its value may be in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, semiPersistSchedIntervalUL IE may be semi-persistent scheduling interval in uplink. Its value in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, twoIntervalsConfig IE may be trigger of two-intervals-Semi-Persistent Scheduling in uplink. If this field is present, two-intervals-SPS is enabled for uplink. Otherwise, two-intervals-SPS is disabled.

In an example, multiple downlink or uplink SPS may be configured for a cell. In an example, multiple SPS RNTIs may be configured when a plurality of SPSs is configured. A base station may transmit to a UE at least one RRC message comprising SPS configuration parameters comprising a first SPS RNTI and a second SPS RNTI. For example, a first SPS RNTI may be configured for a first SPS configuration (e.g. for VOIP), and a second SPS RNTI may be configured for a second SPS configuration (e.g. for V2X communications). The UE may monitor PDCCH for at least DCIs corresponding to the first SPS RNTI and the second SPS RNTI.

When Semi-Persistent Scheduling is enabled by RRC, at least one or more of the following information may be provided: Semi-Persistent Scheduling C-RNTI(s); Uplink Semi-Persistent Scheduling interval semiPersistSchedIntervalUL, number of empty transmissions before implicit release implicitReleaseAfter, if Semi-Persistent Scheduling is enabled for the uplink; Whether twoIntervalsConfig is enabled or disabled for uplink, for TDD; Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink; and/or other parameters.

When Semi-Persistent Scheduling for uplink or downlink is disabled by RRC, the corresponding configured grant or configured assignment may be discarded.

In an example, after a Semi-Persistent downlink assignment is configured, the MAC entity may consider sequentially that the Nth assignment occurs in the subframe for which: (10*SFN+subframe)=[(10*SFNstart time+subframestart time)+N*semiPersistSchedIntervalDL] modulo 10240. Where SFNstart time and subframestart time may be the SFN and subframe, respectively, at the time the configured downlink assignment were (re)initialized.

In an example, after a Semi-Persistent Scheduling uplink grant is configured, the MAC entity may: if twoIntervalsConfig is enabled by upper layer: set the Subframe_Offset according to Table below. else: set Subframe_Offset to 0. consider sequentially that the Nth grant occurs in the subframe for which: (10*SFN+subframe)=[(10*SFNstart time+subframestart time)+N*semiPersistSchedIntervalUL+Subframe_Offset*(N modulo 2)] modulo 10240. Where SFNstart time and subframestart time may be the SFN and subframe, respectively, at the time the configured uplink grant were (re-)initialised. FIG. 11. shows example subframe offset values.

The MAC entity may clear the configured uplink grant immediately after implicitReleaseAfter number of consecutive MAC PDUs containing zero MAC SDUs have been provided by the Multiplexing and Assembly entity, on the Semi-Persistent Scheduling resource. Retransmissions for Semi-Persistent Scheduling may continue after clearing the configured uplink grant.

In an example embodiment, SPS configurations may be enhanced to support transmission of various V2X traffic and/or voice traffic by a UE. There is a need to support multiple SPS configurations for a UE. For example, a UE supporting V2X may need to support multiple uplink SPS configurations for transmitting various periodic (or semi-periodic) traffic and/or voice traffic in the uplink. Other examples may be provided. For example, CAM messages in V2X may be semi-periodic. In some scenarios, CAM message generation may be dynamic in terms of size, periodicity and timing. Such changes may result in misalignment between SPS timing and CAM timing. There may be some regularity in size and periodicity between different triggers. Enhanced SPS mechanisms may be beneficial to transmit V2X traffic, voice traffic, and/or the like. In an example, various SPS periodicity, for example 100 ms and 1 s may be configured.

In an example, multiple SPS configurations may be configured for UU and/or PC5 interface. An eNB may configure multiple SPS configurations for a given UE. In an example, SPS configuration specific MCS (e.g. MCS as a part of the RRC SPS-configuration) and/or SPS-configuration-specific periodicity may be configured. In an example, some of the SPS configuration parameters may be the same across multiple SPS and some other SPS configuration parameters may be different across SPS configurations. The eNB may dynamically trigger/release the different SPS-configurations employing (E)PDCCH DCIs. In an example, the multiple SPS configurations may be indicated by eNB RRC signaling. The dynamical triggering and releasing may be performed by eNB transmitting (E)PDCCH DCI to the UE employing SPS C-RNTI.

In an example embodiment, a UE may transmit UE SPS assistant information to a base station indicating that the UE does not intend and/or intend to transmit data before a transmission associated to an SPS configuration. The eNB may acknowledge the UE indication. For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation.

For instance, the UE may be allowed to report the UE assistance information when change in estimated periodicity and/or timing offset of packet arrival occurs. For V2X communication via Uu, SR mask as per legacy mechanism may be used.

Some example V2X messages are CAM, DENM and BSM. For Example, CAM message may have the following characteristics. Content: status (e.g. time, position, motion state, activated system), attribute (data about dimension, vehicle type and role in the road traffic). Periodicity: typical time difference between consecutive packets generation is bounded to the [0.1, 1] sec range. Length: Variable. For Example, DENM message may have the following characteristics. Content: Contain information related to a variety of events. Periodicity: Event triggers the DENM update. In between two consequent DENM updates, it is repeated with a pre-defined transmission interval. Length: Fixed until DENM update. For Example, BSM message may have the following characteristics. Content: Part I contains some of the basic vehicle state information such as the message ID, vehicle ID, vehicle latitude/longitude, speed and acceleration status. Part II contains two option data frames: VehicleSafetyExtension and VehicleStatus. Periodicity: Periodic, the periodicity may be different considering whether BSM part II is included or not and the different application type. Length: Fixed, with different message size considering whether part II exists or not.

In an example, SPS may be employed for the transmission of BSM, DENMs and CAMs. For example, the UE's speed/position/direction changes within a range. BSM may be periodic traffic with a period of 100 ms. The message size of BSM may be in the range of 132~300 Bytes without certificate and 241~409 Bytes with certificate. DENMs, once triggered, may be transmitted periodically with a given message period which may remain unchanged. The message size of the DENM may be 200~1200 Bytes. If the UE's speed/position/direction does not change or changes within a small range, the CAM generation periodicity may be fixed.

The SPS may be supported for the UL and DL VoIP transmission. In the current SPS specification, the base station may configure SPS periodicity via dedicated RRC signaling. The periodicity of VoIP packet is generally fixed.

The UE may transmit traffic associated with multiple V2X services, which may require different periodicity and packet sizes. The SPS TB size and period may be adapted to different V2X services. Multiple parallel SPS processes may be activated at the UE. The SPS processes may differ in the amount of resource blocks (RBs) allocated and/or SPS period and may correspond to different types of V2X packets. Once the AS layer of UE receives the V2X packets from upper layer, the UE may trigger V2X packet transmissions on the corresponding SPS grant. Multiple UL SPS configurations may be configured for the UE.

The eNB may configure different SPS C-RNTIs for different SPS processes of the UE. SPS activation and release mechanism may be implemented. Employing at least one or more SPS RNTIs, the eNB may trigger which SPS process is activated or released. In an example implementation, in order to support multiple SPS configurations different SPS C-RNTIs may be configured for different SPS traffic types. For example, a first SPS C-RNTI may be configured for SPS configuration to transmit voice traffic, a second SPS C-RNTI may be configured for SPS configuration to transmit a V2X traffic. An eNB may transmit one or more RRC messages comprising multiple SPS configuration parameters. The multiple SPS configuration parameters may comprise multiple SPS-RNTI parameters for multiple SPS traffic types (e.g. multiple UL SPS configurations).

In an example, power-control commands may be provided simultaneously to a group of UEs on PDCCH using one or more DCI formats (e.g., DCI formats 3 or 3A). In an example, an eNB may transmit DCI format 3/3A on a regular basis to adjust the PUCCH transmit power, for example, prior to periodic uplink CSI reports. In an example, an eNB may transmit DCI format 3/3A to adjust PUSCH transmit power of a group of UEs. In an example, an eNB may transmit DCI format 3/3A to power control semi-persistently scheduled UEs. In an example, uplink transmission of PUSCH (UL-SCH) and/or PUCCH (e.g., L1/L2 control signaling) may be without explicit scheduling assignments/grants.

In an example, the power-control command carried on the PDCCH with a first DCI format (e.g., format 3) may consist of two bits, corresponding to the four different transmission power update steps of −1, 0, +1, or +3 dB. In an example, the power-control command carried on the PDCCH with a second DCI format (e.g., format 3A) may consist of one bit, corresponding to the transmission power update steps of −1 and +1 dB.

In an example, the power-control message may be directed to a group of UEs using an RNTI specific for the group of the UEs. A UE may be allocated two power-control RNTIs (e.g., TPC-PUSCH-RNTI and/or TPC-PUCCH-RNTI). In an example, an eNB may configure a group of UEs with a common TPC-PUSCH-RNTI for group power control of PUSCH. In an example, an eNB may configure a group of UEs with a common TPC-PUCCH-RNTI for group power control of PUCCH. In an example, TPC-PUSCH-RNTI and/or TPC-PUCCH-RNTI may comprise a fixed number of bits (e.g., 16 bits) and their value may range from 1 to a first number (e.g., 65523, e.g., 0x0001 to 0xFFF3 in hexadecimal). The power-control RNTIs may be common to a group of UEs and a UE within the group may be informed through RRC signaling about which bit (if UE receives PDCCH of second DCI format, e.g., 3A) or bits (if UE receives PDCCH of first DCI format, e.g., 3) in the DCI message it should follow for power adjustment.

In an example, DCI format 3 may be used for the transmission of TPC commands for PUCCH and PUSCH with 2-bit power adjustments. In an example, the following information may be transmitted by means of the first DCI format (e.g., format 3): TPC command number 1, TPC command number 2, . . . , TPC command number N where $$N = \left\lfloor \frac{L_{format0}}{2} \right\rfloor,$$

and where $L_{format\ 0}$ may be equal to the payload size of format 0 before CRC attachment when format 0 is mapped onto the common search space, including any padding bits appended to format 0. In an example, the parameter tpc-Index and/or tpc-Index-PUCCH-SCell-r13 provided by higher layers may determine the index to the TPC command for a given UE. In an example, if $$\left\lfloor \frac{L_{format0}}{2} \right\rfloor < \frac{L_{format0}}{2},$$

a bit of value zero may be appended to format 3. In an example, for BL/CE UE, $L_{format\ 0}$ and format 0 may be replaced by $L_{format\ 6\text{-}0A}$ and format 6-0A, respectively, in the description above.

In an example, second DCI format (e.g., format 3A) may be used for the transmission of TPC commands for PUCCH and PUSCH with single bit power adjustments. In an example, the following information may be transmitted by means of the second DCI format (e.g., format 3A): TPC command number 1, TPC command number 2, . . . , TPC command number M where $M=L_{format\ 0}$, and where $L_{format\ 0}$ may be equal to the payload size of format 0 before CRC attachment when format 0 is mapped onto the common search space, including any padding bits appended to format 0. The parameter tpc-Index or tpc-Index-PUCCH-SCell-r13 provided by higher layers determines the index to the TPC command for a given UE. In an example, for BL/CE UE, $L_{format\ 0}$ and format 0 may be replaced by $L_{format\ 6\text{-}0A}$ and format 6-0A, respectively, in the description above.

In an example, $\delta_{PUSCH,c}$ may be a correction value, may be referred to as a TPC command, and may be jointly coded with other TPC commands in PDCCH/MPDCCH with DCI format 3/3A whose CRC parity bits are scrambled with TPC-PUSCH-RNTI.

In an example, for serving cell c and a non-BL/CE UE, the UE may attempt to decode a DCI format 3/3A with the UE's TPC-PUSCH-RNTI in every subframe except when in DRX or where serving cell c is deactivated.

In an example, the $\delta_{PUSCH}$ dB accumulated values signaled on PDCCH/MPDCCH with DCI format 3/3A may be according to one of the FIG. 13 or FIG. 14 as determined by the parameter TPC-Index provided by higher layers.

In an example, in response to a UE being configured by higher layers to decode PDCCHs with the CRC scrambled by the TPC-PUCCH-RNTI, the UE may decode the PDCCH according to the combination defined in FIG. 15. The notation 3/3A may imply that the UE may receive either DCI format 3 or DCI format 3A depending on the configuration. In an example, in response to a UE being configured by higher layers to decode MPDCCHs with the CRC scrambled by the TPC-PUCCH-RNTI, the UE may decode the MPD-CCH according to the combination defined in FIG. 16. The notation 3/3A may imply that the UE may receive either DCI format 3 or DCI format 3A depending on the configuration. In an example, in response to a UE being configured by higher layers to decode PDCCHs with the CRC scrambled by the TPC-PUSCH-RNTI, the UE may decode the PDCCH according to the combination defined in FIG. 15. The notation 3/3A may imply that the UE may receive either DCI format 3 or DCI format 3A depending on the configuration. In an example, in response to a UE being configured by higher layers to decode MPDCCHs with the CRC scrambled by the TPC-PUSCH-RNTI, the UE may decode the MPD-CCH according to the combination defined in FIG. 17. The notation 3/3A imply that the UE may receive either DCI format 3 or DCI format 3A depending on the configuration.

Group power control is a useful procedure to control the transmission (e.g., PUSCH and/or PUCCH transmissions) power levels of a group of UEs. In an example, group power control may be used to control PUCCH transmission (e.g., on a primary cell and/or a secondary cell) power of a group of UEs, for example prior to periodic CSI report. In an example, group power control may be used to control PUSCH transmissions of a group of UEs on a primary cell. In an example, the PUSCH transmissions of the group of UEs may correspond to semi-persistently scheduled transmissions. In legacy group power control procedures, semi-persistent scheduling may be configured for a UE on SPCell only (e.g., primary cell and/or primary secondary cell (PS-Cell)) and a UE may be configured with a single index (e.g., a primary index) for group power control of PUSCH on the SPCell. The legacy group power control of PUSCH is inefficient when performed on the secondary cell (e.g., for group power control of semi-persistent scheduled UEs on a secondary cell). For example, the wireless device may not determine a power control command for PUSCH transmission on a secondary cell in response to receiving a group power control. The wireless device may not determine whether a power control command in a group power control DCI is directed to a primary cell or a secondary cell. There is a need to enhance the legacy group power control procedures for group power control on secondary cells.

Figure 18:
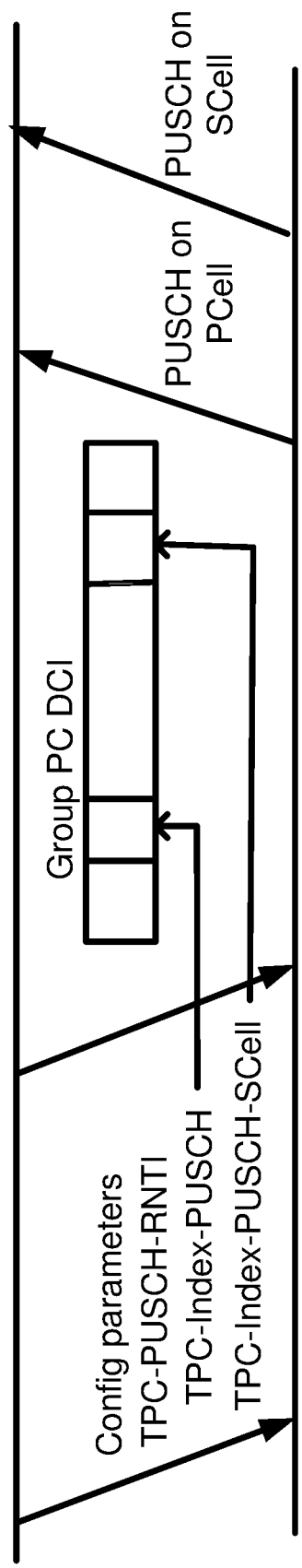
FIG. 18 is an example procedure for group power control as per an aspect of an embodiment of the present disclosure.

In an example embodiment, group power control DCI (e.g., DCI format 3 or 3A) may be directed to a group of UEs for their PUSCH transmission on a secondary cell. In an example, group power control DCI may be directed to a group of UEs for their PUCCH transmission on a secondary cell. In an example, the eNB may transmit a PDCCH with a group power control DCI message on a serving cell (e.g., primary cell and/or secondary cell) for power control of a group of UEs for their PUSCH transmission on the serving cell. The eNB may configure a UE with a tpc-PUSCH-RNTI and/or a tpc-PUCCH-RNTI for group power control of PUSCH and PUCCH, respectively. The cyclic redundancy check (CRC) bits associated with the group power control DCI transmitted on the PDCCH (e.g., on common search space of the primary cell and/or the serving cell) for PUSCH and/or PUCCH power control may be scrambled with tpc-PUSCH-RNTI or tpc-PUCCH-RNTI, respectively. In an example, a UE may monitor the common search space of a serving cell to detect PDCCH with DCI scrambled with a group power control RNTI (e.g., tpc-PUSCH-RNTI and/or tpc-PUCCH-RNTI). In an example, a UE may monitor common search space of a primary cell and/or common search space of a serving cell that is configured with semi-persistent scheduling and/or common search space of a serving cell that is configured with group power control and/or common search space of another serving cell to detect PDCCH with DCI scrambled with group power control RNTI (e.g., tpc-PUSCH-RNTI and/or tpc-PUCCH-RNTI). In an example embodiment, a parameter TPC-Index and/or TPC-Index-PUSCH (e.g., a primary index) may be provided by higher layers for the UE (e.g., through RRC signaling) for group power control of PUSCH transmissions by a group of UEs on the primary cell. In an example embodiment, a parameter TPC-Index-PUSCH-SCell (e.g., a secondary index), and/or alike, may be provided by higher layers (e.g., through RRC signaling) and may be used by the UE to determine an index to the TPC command for the UE's PUSCH transmission on a secondary cell. An example procedure is shown in FIG. 18. In an example, the DCI may comprise a plurality of power control commands. The wireless device may use the primary index (e.g., TPC-Index-PUSCH) to determine a power control command in the plurality of power control commands for PUSCH transmission on a primary cell. The wireless device may use the secondary index (e.g., TPC-Index-PUSCH-SCell) to determine a power control command in the plurality of power control commands for PUSCH transmission on the secondary cell. In an example, the IE TPC-PDCCH-Config may be used to specify the RNTIs and/or indexes for PUCCH and PUSCH power control including PUSCH and/or PUCCH power control on a serving cell (e.g., primary and/or secondary cell). In an example, the power control function may either be setup or released with the IE. An example PDCCH configuration information element is shown below:

```
TPC-PDCCH-Config ::=           CHOICE {
  release                        NULL,
  setup                          SEQUENCE {
    tpc-RNTI                       BIT STRING (SIZE (16)),
    tpc-Index                      TPC-Index
  }
}
TPC-PDCCH-ConfigSCell-r13 ::=  CHOICE {
  release                        NULL,
  setup                          SEQUENCE {
    tpc-Index-PUCCH-SCell-r13      TPC-Index
  }
}
TPC-PDCCH-ConfigSCell-r14 ::=  CHOICE {
  release                        NULL,
  setup                          SEQUENCE {
    tpc-Index-PUSCH-SCell-r14      TPC-Index
  }
}
TPC-Index ::=                  CHOICE {
  indexOfFormat3                 INTEGER (1..15),
  indexOfFormat3A                INTEGER (1..31)
}
```

In an example, indexOfFormat3 may be the index of N in response to DCI format 3 being used. In an example, indexOfFormat3A may be the index of M in response to DCI format 3A being used. In an example, tpc-Index may be the index of N or M. In an example, tpc-Index-PUCCH-SCell may be index of N or M, where N or M may be dependent on the used DCI format (e.g., format 3 or 3A). In an example, tpc-RNTI may be the RNTI for group power control (e.g., using DCI format 3/3A). In an example, tpc-Index-PUSCH-SCell may be index of N or M, where N or M may be dependent on the used DCI format (e.g., format 3 or 3A). In an example, a common group power control DCI (e.g., format 3 or 3A) may be used to power control PUSCH transmission for a group of semi-persistently scheduled UEs on a primary and/or secondary cell.

In an example embodiment, an eNB may transmit group power control DCI messages on more than one cell. In an example, the eNB may scramble the CRC corresponding to the DCI message transmitted on a serving cell (e.g., primary cell or secondary cell) with TPC-PUSCH-RNTI for power control of PUSCH transmissions of a group of UEs on the serving cell. In an example, the eNB may scramble the CRC corresponding to the DCI message transmitted on a serving cell (e.g., primary or secondary cell) with TPC-PUCCH-RNTI for power control of PUCCH transmissions of a group of UEs on the serving cell. In an example, the RRC configured parameter tpc-Index (for PUSCH/PUCCH power control on the primary cell) or the RRC configured parameter tpc-Index-PUCCH-SCell (in response to the DCI being used for PUCCH power control on a secondary cell) or the configured parameter (e.g., RRC configured) tpc-Index-PUSCH-SCell (in response to the DCI being transmitted for PUSCH power control on the secondary cell) may provide an index to the TPC command in the DCI message.

In an example, a UE may be indicated, e.g., implicitly or explicitly, on and/or for which SCell(s) the UE may expect a group power control DCI (e.g., a UE may expect group power control DCI on and/or for a secondary cell that is semi-persistently scheduled). A UE may consider the indicated SCell(s) on its search for group power control DCI, e.g., the UE may limit the search for group power control DCI to the common search space of SCell(s) that the UE may except such DCI.

In an example embodiment, group power control DCI (e.g., DCI format 3 or 3A) may be directed to a group of UEs for their PUSCH transmission on a secondary cell. In an example, group power control DCI may be directed to a group of UEs for their PUCCH transmission on a secondary cell. In an example, the eNB may transmit a PDCCH with a group power control DCI message on a serving cell (e.g., primary cell and/or secondary cell) for power control of a group of UEs for their PUSCH transmission on the serving cell. The eNB may configure a UE with a tpc-PUSCH-RNTI and/or a tpc-PUCCH-RNTI for group power control of PUSCH and PUCCH, respectively. The cyclic redundancy check (CRC) corresponding to the group power control DCI transmitted on the PDCCH of the serving cell may be scrambled with tpc-PUSCH-RNTI or tpc-PUCCH-RNTI for PUSCH or PUCCH power control, respectively. In an example, a UE may monitor the common search space of a serving cell to detect PDCCH with DCI scrambled with a group power control RNTI (e.g., tpc-PUSCH-RNTI and/or tpc-PUCCH-RNTI). In an example, a UE may monitor common search space of a serving cell that is configured with semi-persistent scheduling or common search space of a serving cell that is configured with group power control to detect PDCCH with DCI scrambled with group power control RNTI (e.g., tpc-PUSCH-RNTI and/or tpc-PUCCH-RNTI). In an example, the parameters tpc-Index-PUSCH-SCell1-r14 through tpc-Index-PUSCH-SCell31-r14 may be provided by higher layers (e.g., through RRC signaling) and may be used by a UE to determine the index to the TPC command for the UE's PUSCH transmission on the corresponding secondary cell. In an example, if a UE, configured with k≤31 secondary cells, receives the group power control DCI message on a secondary cell with cell index j (j≤k), the UE may use the parameter tpc-Index-PUSCH-SCell1-r14 to determine the index to the TPC command for the UE's PUSCH transmission on secondary cell with cell index j. In an example, the IE TPC-PDCCH-Config may be used to specify the RNTIs and indexes for PUCCH and PUSCH power control including PUSCH and/or PUCCH power control on a serving cell (e.g., primary and/or secondary cell). In an example, the power control function may either be setup or released with the IE. An example PDCCH configuration information element is shown below:

```
TPC-PDCCH-Config ::=            CHOICE {
    release                         NULL,
    setup                           SEQUENCE {
        tpc-RNTI                        BIT STRING (SIZE (16)),
        tpc-Index                       TPC-Index
    }
}
TPC-PDCCH-ConfigSCell-r13 ::=   CHOICE {
    release                         NULL,
    setup                           SEQUENCE {
        tpc-Index-PUCCH-SCell-r13       TPC-Index
    }
}
TPC-PDCCH-ConfigSCell-r14 ::=   CHOICE {
    release                         NULL,
    setup                           SEQUENCE {
        tpc-Index-PUSCH-SCell1-r14      TPC-Index
        tpc-Index-PUSCH-SCell2-r14      TPC-Index
        ...
        tpc-Index-PUSCH-SCell31-r14     TPC-Index
    }
}
TPC-Index ::=                   CHOICE {
    indexOfFormat3                  INTEGER (1..15),
    index OfFormat3A                INTEGER (1..31)
}
```

In an example, indexOfFormat3 may be the index of N in response to a first DCI format (e.g., DCI format 3) being used. In an example, indexOfFormat3A may be the index of M in response to DCI format 3A being used. In an example, tpc-Index may be the index of N or M. In an example, tpc-Index-PUCCH-SCell may be index of N or M, where N or M may be dependent on the used DCI format (e.g., format 3 or 3A). In an example, tpc-RNTI may be the RNTI for group power control (e.g., using DCI format 3/3A). In an example, tpc-Index-PUSCH-SCell1, . . . , tpc-Index-PUSCH-SCell31 may be index of N or M, where N or M may be dependent on the used DCI format (e.g., format 3 or 3A). In an example, a common group power control DCI (e.g., format 3 or 3A) may be used to power control PUSCH transmission for a group of semi-persistently scheduled UEs on a primary and/or secondary cell. In an example, an eNB may transmit group power control DCI messages on more than one cell. In an example, the eNB may scramble the CRC of the DCI message transmitted on a serving cell (e.g., primary or secondary cell) with TPC-PUSCH-RNTI for power control of PUSCH transmissions of a group of UEs on the serving cell. In an example, the eNB may scramble the CRC of the DCI message transmitted on a serving cell (e.g., primary or secondary cell) with TPC-PUCCH-RNTI for power control of PUCCH transmissions of a group of UEs on the serving cell. In an example, the RRC configured parameter tpc-Index (e.g., for PUSCH/PUCCH power control on the primary cell) or the RRC configured parameter tpc-Index-PUCCH-SCell (e.g., in response to the DCI being used for PUCCH power control on a secondary cell) or the configured parameter (e.g., RRC configured) tpc-Index-PUSCH-SCellj (e.g., in response to the DCI being transmitted on the secondary cell with cell index j for PUSCH power control for secondary cell with cell index j) may provide an index to the TPC command in the DCI message.

In an example embodiment, group power control DCI (e.g., DCI format 3 or 3A) may be directed to a group of UEs for their PUSCH transmission on a secondary cell. In an example, group power control DCI may be directed to a group of UEs for their PUCCH transmission on a secondary cell. In an example, the eNB may transmit one or more PDCCH with one or more group power control DCI message(s) on the primary cell for power control of a group of UEs for their PUSCH transmission on one or more serving cell(s) (e.g., primary cell and/or secondary cell). The eNB may configure a UE with cell-specific tpc-PUSCH-RNTI and/or cell-specific tpc-PUCCH-RNTI for group power control of PUSCH and PUCCH, respectively. The cyclic redundancy check (CRC) bits corresponding to a group power control DCI transmitted on the PDCCH of the primary cell may be scrambled with a serving cell specific tpc-PUSCH-RNTI or a serving cell specific tpc-PUCCH-RNTI for PUSCH or PUCCH power control on the serving cell, respectively.

In an example, an IE (e.g., TPC-PDCCH-Config) may be used to specify the RNTIs and/or indexes for PUCCH and PUSCH power control including PUSCH and/or PUCCH power control on a secondary cell. The power control function may either be setup or released with the IE.

```
TPC-PDCCH-Config ::=        CHOICE {
    release                     NULL,
    setup                       SEQUENCE {
        tpc-RNTI                    BIT STRING (SIZE (16)),
        tpc-RNTI-SCell1             BIT STRING (SIZE (16)),
        tpc-RNTI-SCell2             BIT STRING (SIZE (16)),
        ...
```

```
    tpc-RNTI-SCell31            BIT STRING (SIZE (16)),
    tpc-Index                   TPC-Index
    }
}
TPC-PDCCH-ConfigSCell-r13 ::=   CHOICE {
    release                     NULL,
    setup                       SEQUENCE {
        tpc-Index-PUCCH-SCell-r13   TPC-Index
    }
}
TPC-Index ::=                   CHOICE {
    indexOfFormat3              INTEGER (1..15),
    indexOfFormat3A             INTEGER (1..31)
}
```

In an example, indexOfFormat3 may be the index of N when DCI format 3 is used. In an example, indexOfFormat3A may be the index of M when DCI format 3A is used. In an example, tpc-Index may be the index of N or M. In an example, tpc-Index-PUCCH-SCell may be index of N or M, where N or M may be dependent on the used DCI format (e.g., format 3 or 3A).

In an example, tpc-RNTI may be the RNTI for scrambling the CRC of the group power control DCI message (e.g., using DCI format 3 or 3A) for PUSCH and/or PUCCH power control on the primary cell of a UE. In an example, tpc-RNTI-SCell1, tpc-RNTI-SCell2, . . . , tpc-RNTI-SCell31 may be the RNTI for scrambling the CRC for group power control DCI message (e.g., using DCI format 3 or 3A) for PUSCH and/or PUCCH power control on secondary cells with cell index 1 (e.g., SCell$_1$) through secondary cell with cell index 31 (e.g., SCell$_{31}$). In an example, if a UE is configured with k≤31 secondary cells, the eNB may use tpc-RNTI-SCellj for transmission of a group power control DCI message for PUSCH and/or PUCCH power control on a secondary cell with cell index j (j≤k).

In an example, a common group power control DCI message (e.g., using format 3 or 3A) transmitted by the eNB on the primary cell may be used to power control PUSCH transmission for a group of semi-persistently scheduled UEs on a serving cell. In an example, the eNB may scramble the CRC bits associated with the DCI message with a serving cell-specific TPC-PUSCH-RNTI for power control of PUSCH transmissions of a group of UEs on the serving cell. In an example, the eNB may scramble the CRC bits associated with the DCI message with a serving cell-specific TPC-PUCCH-RNTI for power control of PUCCH transmissions of a group of UEs on the serving cell. In an example, the TPC-PUSCH-RNTI or TPC-PUCCH-RNTI that scrambles the CRC associated with the received DCI message may implicitly indicate the serving cell for the UE that the DCI message is directed to. The parameter tpc-Index may indicate the index of a TPC command for a given UE.

In an example, a UE may be indicated, e.g., implicitly or explicitly, for which SCell(s) the UE may expect a group power control DCI (e.g., a UE may expect group power control DCI on a secondary cell that is semi-persistently scheduled). A UE may limit the search for group power control DCI to SCell(s) that the UE may except such DCI. In an example, UE may search on the common search space of the primary cell for DCI with CRC scrambled with the cell-specific RNTIs that the UE is expecting to receive group power control DCI.

In an example embodiment, group power control DCI (e.g., DCI format 3 or 3A) may be directed to a group of UEs for their PUSCH transmission on a secondary cell. In an example, group power control DCI may be directed to a group of UEs for their PUCCH transmission on a secondary cell. In an example, the eNB may transmit one or more PDCCH with one or more group power control DCI message(s) on the primary cell for power control of a group of UEs for their PUSCH transmission on one or more serving cell(s) (e.g., primary cell and/or secondary cell). The eNB may configure a UE with cell-specific tpc-PUSCH-RNTI and/or cell-specific tpc-PUCCH-RNTI for group power control of PUSCH and PUCCH, respectively. The cyclic redundancy check (CRC) bits associated with a group power control DCI transmitted on the PDCCH of the primary cell may be scrambled with a serving cell specific tpc-PUSCH-RNTI or a serving cell specific tpc-PUCCH-RNTI for PUSCH or PUCCH power control on the serving cell, respectively. In an example, the parameter tpc-Index-PUSCH-SCell-r14 may be provided by higher layers (e.g., through RRC signaling) and may be used by a UE to determine the index to the TPC command for the UE's PUSCH transmission on a secondary cell.

In an example, the IE TPC-PDCCH-Config may be used to specify the RNTIs and indexes for PUCCH and PUSCH power control including PUSCH and/or PUCCH power control on a secondary cell. The power control function may either be setup or released with the IE.

```
TPC-PDCCH-Config ::=            CHOICE {
    release                     NULL,
    setup                       SEQUENCE {
        tpc-RNTI                BIT STRING (SIZE (16)),
        tpc-RNTI-SCell1         BIT STRING (SIZE (16)),
        tpc-RNTI-SCell2         BIT STRING (SIZE (16)),
        ...
        tpc-RNTI-SCell31        BIT STRING (SIZE (16)),
        tpc-Index               TPC-Index
    }
}
TPC-PDCCH-ConfigSCell-r13 ::=   CHOICE {
    release                     NULL,
    setup                       SEQUENCE {
        tpc-Index-PUCCH-SCell-r13   TPC-Index
    }
}
TPC-PDCCH-ConfigSCell-r14 ::=   CHOICE {
    release                     NULL,
    setup                       SEQUENCE {
        tpc-Index-PUSCH-SCell-r14   TPC-Index
    }
}
TPC-Index ::=                   CHOICE {
    indexOfFormat3              INTEGER (1..15),
    indexOfFormat3A             INTEGER (1..31)
}
```

In an example, indexOfFormat3 may be the index of N when DCI format 3 is used. In an example, indexOfFormat3A may be the index of M when DCI format 3A is used. In an example, tpc-Index may be the index of N or M. In an example, tpc-Index-PUCCH-SCell may be index of N or M, where N or M may be dependent on the used DCI format (e.g., format 3 or 3A).

In an example, tpc-RNTI may be the RNTI for scrambling the CRC of the group power control DCI message (e.g., using DCI format 3 or 3A) for PUSCH and/or PUCCH power control on the primary cell of a UE. In an example, tpc-RNTI-SCell1, tpc-RNTI-SCell2, . . . , tpc-RNTI-SCell31 may be the RNTI for scrambling the CRC for group power control DCI message (e.g., using DCI format 3 or 3A) for PUSCH and/or PUCCH power control on secondary cells with cell index 1 (e.g., SCell1) through secondary cell with cell index 31 (e.g., SCell31). In an example, if a UE configured with k≤31 secondary cells, the eNB may use tpc-RNTI-SCellj for transmission of a group power control DCI message for PUSCH and/or PUCCH power control on a secondary cell with cell index j (j≤k).

In an example, tpc-Index-PUSCH-SCell may be index of N or M, where N or M may be dependent on the used DCI format (e.g., format 3 or 3A).

In an example, a common group power control DCI message (e.g., using format 3 or 3A) transmitted by the eNB on the primary cell may be used to power control PUSCH transmission for a group of semi-persistently scheduled UEs on a serving cell. In an example, the eNB may scramble the CRC bits associated with the DCI message with a serving cell-specific TPC-PUSCH-RNTI for power control of PUSCH transmissions of a group of UEs on the serving cell. In an example, the eNB may scramble the CRC bits associated with the DCI message with a serving cell-specific TPC-PUCCH-RNTI for power control of PUCCH transmissions of a group of UEs on the serving cell. In an example, the TPC-PUSCH-RNTI or TPC-PUCCH-RNTI that scrambles the CRC bits associated with the received DCI message may implicitly indicate the serving cell for the UE that the DCI message is directed to. In an example, the RRC configured parameter tpc-Index (for PUSCH/PUCCH power control on primary cell) or the RRC configured parameter tpc-Index-PUCCH-SCell (for PUCCH power control on a secondary cell) or the configured parameter (e.g., RRC configured) tpc-Index-PUSCH-SCell (for PUSCH power control on a secondary cell) may provide an index to the TPC command in the DCI message.

In an example, a UE may be indicated, e.g., implicitly or explicitly, for which SCell(s) the UE may expect a group power control DCI (e.g., a UE may expect group power control DCI on a secondary cell that is semi-persistently scheduled). A UE may limit the search for group power control DCI to SCell(s) that the UE may except such DCI. In an example, UE may search on the common search space of the primary cell for DCI with CRC scrambled with the cell-specific RNTIs that the UE is expecting to receive group power control DCI.

In an example embodiment, group power control DCI (e.g., DCI format 3 or 3A) may be directed to a group of UEs for their PUSCH transmission on a secondary cell. In an example, group power control DCI may be directed to a group of UEs for their PUCCH transmission on a secondary cell. In an example, the eNB may transmit one or more PDCCH with one or more group power control DCI message(s) on the primary cell for power control of a group of UEs for their PUSCH transmission on one or more serving cell(s) (e.g., primary cell and/or secondary cell). The eNB may configure a UE with cell-specific tpc-PUSCH-RNTI and/or cell-specific tpc-PUCCH-RNTI for group power control of PUSCH and PUCCH, respectively. The cyclic redundancy check (CRC) part of a group power control DCI transmitted on the PDCCH of the primary cell may be scrambled with a serving cell specific tpc-PUSCH-RNTI or a serving cell specific tpc-PUCCH-RNTI for PUSCH or PUCCH power control on the serving cell, respectively. In an example, the parameters tpc-Index-PUSCH-SCell1-r14 through tpc-Index-PUSCH-SCell31-r14 may be provided by higher layers (e.g., through RRC signaling) and may be used by a UE to determine the index to the TPC command for the UE's PUSCH transmission on the corresponding secondary cell. In an example, if a UE, configured with k≤31 secondary cells, receives the group power control DCI message directed to a secondary cell with cell index j (j≤k), the UE may use the parameter tpc-Index-PUSCH-SCellj-r14 to determine the index to the TPC command for the UE's PUSCH transmission on secondary cell with cell index j.

In an example, the IE TPC-PDCCH-Config may be used to specify the RNTIs and indexes for PUCCH and PUSCH power control including PUSCH and/or PUCCH power control on a secondary cell. The power control function may either be setup or released with the IE.

```
TPC-PDCCH-Config ::=              CHOICE {
    release                       NULL,
    setup                         SEQUENCE {
        tpc-RNTI                  BIT STRING (SIZE (16)),
        tpc-RNTI-SCell1           BIT STRING (SIZE (16)),
        tpc-RNTI-SCell2           BIT STRING (SIZE (16)),
        ...
        tpc-RNTI-SCell31          BIT STRING (SIZE (16)),
        tpc-Index                 TPC-Index
    }
}
TPC-PDCCH-ConfigSCell-r13 ::=     CHOICE {
    release                       NULL,
    setup                         SEQUENCE {
        tpc-Index-PUCCH-SCell-r13 TPC-Index
    }
}
TPC-PDCCH-ConfigSCell-r14 ::=     CHOICE {
    release                       NULL,
    setup                         SEQUENCE {
        tpc-Index-PUSCH-SCell1-r14   TPC-Index
        tpc-Index-PUSCH-SCell2-r14   TPC-Index
    ...
        tpc-Index-PUSCH-SCell31-r14  TPC-Index
    }
}
TPC-Index ::=                     CHOICE {
    indexOfFormat3                INTEGER (1..15),
    indexOfFormat3A               INTEGER (1..31)
}
```

In an example, indexOfFormat3 may be the index of N when DCI format 3 is used. In an example, indexOfFormat3A may be the index of M when DCI format 3A is used. In an example, tpc-Index may be the index of N or M. In an example, tpc-Index-PUCCH-SCell may be index of N or M, where N or M may be dependent on the used DCI format (e.g., format 3 or 3A).

In an example, tpc-RNTI may be the RNTI for scrambling the CRC of the group power control DCI message (e.g., using DCI format 3 or 3A) for PUSCH and/or PUCCH power control on the primary cell of a UE. In an example, tpc-RNTI-SCell1, tpc-RNTI-SCell2, . . . , tpc-RNTI-SCell31 may be the RNTI for scrambling the CRC for group power control DCI message (e.g., using DCI format 3 or 3A) for PUSCH and/or PUCCH power control on secondary cells with cell index 1 (e.g., SCell1) through secondary cell with cell index 31 (e.g., SCell31). In an example, if a UE configured with k≤31 secondary cells, the eNB may use tpc-RNTI-SCellj for transmission of a group power control DCI message for PUSCH and/or PUCCH power control on a secondary cell with cell index j (j≤k). In an example, tpc-Index-PUSCH-SCell1, . . . , tpc-Index-PUSCH-SCell31 may be index of N or M, where N or M may be dependent on the used DCI format (e.g., format 3 or 3A).

In an example embodiment, a common group power control DCI message (e.g., using format 3 or 3A) transmitted by the eNB on the primary cell may be used to power control PUSCH transmission for a group of semi-persistently scheduled UEs on a serving cell. In an example, the eNB may scramble the CRC bits associated with the DCI message with a serving cell-specific TPC-PUSCH-RNTI for power control of PUSCH transmissions of a group of UEs on the serving cell. In an example, the eNB may scramble the CRC bits associated with the DCI message with a serving cell-specific TPC-PUCCH-RNTI for power control of PUCCH transmissions of a group of UEs on the serving cell. In an example, the TPC-PUSCH-RNTI or TPC-PUCCH-RNTI that scrambles the CRC bits associated with the received DCI message may implicitly indicate the serving cell for the UE that the DCI message is directed to. In an example, the RRC configured parameter tpc-Index (for PUSCH/PUCCH power control on primary cell) or the RRC configured parameter tpc-Index-PUCCH-SCell (for PUCCH power control on a secondary cell) or the configured parameter (e.g., RRC configured) tpc-Index-PUSCH-SCellj (for PUSCH power control on a secondary cell with cell index j) may provide an index to the TPC command in the DCI message.

In an example, a UE may be indicated, e.g., implicitly or explicitly, for which SCell(s) the UE may expect a group power control DCI (e.g., a UE may expect group power control DCI on a secondary cell that is semi-persistently scheduled). A UE may limit the search for group power control DCI to SCell(s) that the UE may except such DCI. In an example, UE may search on the common search space of the primary cell for DCI with CRC scrambled with the cell-specific RNTIs that the UE is expecting to receive group power control DCI.

In an example embodiment, group power control DCI (e.g., DCI format 3 or 3A) may be directed to a group of UEs for their PUSCH transmission on a secondary cell. In an example, group power control DCI may be directed to a group of UEs for their PUCCH transmission on a secondary cell. In an example, the eNB may transmit one or more PDCCH with one or more group power control DCI message(s) on the primary cell for power control of a group of UEs for their PUSCH transmission on one or more serving cell(s) (e.g., primary cell and/or secondary cell). The eNB may configure a UE with tpc-PUSCH-RNTI and/or tpc-PUCCH-RNTI for group power control of PUSCH and PUCCH, respectively. The cyclic redundancy check (CRC) bits associated with a group power control DCI transmitted on the PDCCH of the primary cell may be scrambled with tpc-PUSCH-RNTI (or a value derived from tpc-PUSCH-RNTI depending on a serving cell) or tpc-PUCCH-RNTI (or a value derived from tpc-PUCCH-RNTI depending on a serving cell) for PUSCH or PUCCH power control on the serving cell, respectively.

In an example, the range of values that tpc-PUSCH-RNTI or tpc-PUCCH-RNTI may take (e.g., 1 to 65523 in decimal or 0x0001 to 0xFFF3 in hexadecimal) may be partitioned among the serving cells (e.g., among the primary cell and secondary cells or among the primary cell and active secondary cells). In an example, the permissible range for tpc-PUSCH-RNTI or tpc-PUCCH-RNTI may be divided between the serving cells. In an example with 3 serving cells (e.g., one primary cell and two active secondary cells), tpc-PUSCH-RNTI or tpc-PUCCH-RNTI for PDCCH transmitted on the primary cell may take values in the range 1 to 21841, tpc-PUSCH-RNTI or tpc-PUCCH-RNTI for PDCCH transmitted on the secondary cell with smallest cell index may take values in the range 21842 to 43682, and tpc-PUSCH-RNTI or tpc-PUCCH-RNTI for PDCCH transmitted on the secondary cell with second smallest cell index may take values in the range 43683 to 65523. In an example, the eNB may configure a UE with a single tpc-RNTI (e.g., tpc-PUSCH-RNTI and/or TPC-PUCCH-RNTI) for primary cell and the tpc-RNTI for the secondary cells may be implicitly derived by the UE. In an example, if the tpc-RNTI is the nth position in the partition associated with the primary cell, the tpc-RNTI for a secondary cell is the nth position in the partition associated with the secondary cell.

In an example, the IE TPC-PDCCH-Config may be used to specify the RNTIs and indexes for PUCCH and PUSCH power control including PUSCH and/or PUCCH power control on a secondary cell. The power control function may either be setup or released with the IE.

```
TPC-PDCCH-Config ::=            CHOICE {
  release                         NULL,
  setup                           SEQUENCE {
    tpc-RNTI                        BIT STRING (SIZE (16)),
    tpc-Index                       TPC-Index
  }
}
TPC-PDCCH-ConfigSCell-r13 ::=   CHOICE {
  release                         NULL,
  setup                           SEQUENCE {
    tpc-Index-PUCCH-SCell-r13       TPC-Index
  }
}
TPC-Index ::=                   CHOICE {
  indexOfFormat3                  INTEGER (1..15),
  indexOfFormat3A                 INTEGER (1..31)
}
```

In an example, indexOfFormat3 may be the index of N when DCI format 3 is used. In an example, indexOfFormat3A may be the index of M when DCI format 3A is used. In an example, tpc-Index may be the index of N or M. In an example, tpc-Index-PUCCH-SCell may be index of N or M, where N or M may be dependent on the used DCI format (e.g., format 3 or 3A). In an example, tpc-RNTI may be the RNTI for group power control (e.g., using DCI format 3/3A).

In an example embodiment, a common group power control DCI (e.g., format 3 or 3A) transmitted by the eNB on the primary cell may be used to power control PUSCH transmission of a group of semi-persistently scheduled UEs on a serving cell. In an example, the eNB may scramble the CRC bits associated with a DCI message with TPC-PUSCH-RNTI (or a value derived from TPC-PUSCH-RNTI depending on the serving cell) for power control of PUSCH transmissions of a group of UEs on a serving cell. In an example, the eNB may scramble the CRC bits associated with a DCI message with TPC-PUCCH-RNTI (or a value derived from TPC-PUCCH-RNTI depending on the serving cell) for power control of PUCCH transmissions of a group of UEs on a serving cell. In an example, the RNTI that scrambles the CRC of a received DCI message (e.g., indicated explicitly for the primary cell and derived for the secondary cells) may implicitly indicate the serving cell for the UE that the DCI message is directed to. The parameter tpc-Index may indicate the index of a TPC command for a given UE.

In an example, a UE may be indicated, e.g., implicitly or explicitly, for which SCell(s) the UE may expect a group power control DCI (e.g., a UE may expect group power control DCI on a secondary cell that is semi-persistently scheduled). A UE may limit the search for group power control DCI to SCell(s) that the UE may except such DCI. In an example, UE may search on the common search space of the primary cell for DCI with CRC scrambled with the cell-specific RNTIs that the UE is expecting to receive group power control DCI.

In an example embodiment, group power control DCI (e.g., DCI format 3 or 3A) may be directed to a group of UEs for their PUSCH transmission on a secondary cell. In an example, group power control DCI may be directed to a group of UEs for their PUCCH transmission on a secondary cell. In an example, the eNB may transmit one or more PDCCH with one or more group power control DCI message(s) on the primary cell for power control of a group of UEs for their PUSCH transmission on one or more serving cell(s) (e.g., primary cell and/or secondary cell). The eNB may configure a UE with tpc-PUSCH-RNTI and/or tpc-PUCCH-RNTI for group power control of PUSCH and PUCCH, respectively. The cyclic redundancy check (CRC) part of a group power control DCI transmitted on the PDCCH of the primary cell may be scrambled with tpc-PUSCH-RNTI (or a value derived from tpc-PUSCH-RNTI depending on a serving cell) or tpc-PUCCH-RNTI (or a value derived from tpc-PUCCH-RNTI depending on a serving cell) for PUSCH or PUCCH power control on the serving cell, respectively. In an example, the parameter tpc-Index-PUSCH-SCell-r14 may be provided by higher layers (e.g., through RRC signaling) and may be used by a UE to determine the index to the TPC command for the UE's PUSCH transmission on a secondary cell.

In an example, the range of values that tpc-PUSCH-RNTI or tpc-PUCCH-RNTI may take (e.g., 1 to 65523 in decimal or 0x0001 to 0xFFF3 in hexadecimal) may be partitioned among the serving cells (e.g., among the primary cell and secondary cells or among the primary cell and active secondary cells). In an example, the permissible range for tpc-PUSCH-RNTI or tpc-PUCCH-RNTI may be divided between the serving cells. In an example with 3 serving cells (e.g., one primary cell and two active secondary cells), tpc-PUSCH-RNTI or tpc-PUCCH-RNTI for PDCCH transmitted on the primary cell may take values in the range 1 to 21841, tpc-PUSCH-RNTI or tpc-PUCCH-RNTI for PDCCH transmitted on the secondary cell with smallest cell index may take values in the range 21842 to 43682, and tpc-PUSCH-RNTI or tpc-PUCCH-RNTI for PDCCH transmitted on the secondary cell with second smallest cell index may take values in the range 43683 to 65523. In an example, the eNB may configure a UE with a single tpc-RNTI (e.g., tpc-PUSCH-RNTI and/or TPC-PUCCH-RNTI) for primary cell and the tpc-RNTI for the secondary cells may be implicitly derived by the UE. In an example, if the tpc-RNTI is the nth position in the partition associated with the primary cell, the tpc-RNTI for a secondary cell is the nth position in the partition associated with the secondary cell.

In an example, the IE TPC-PDCCH-Config may be used to specify the RNTIs and indexes for PUCCH and PUSCH power control including PUSCH and/or PUCCH power control on a secondary cell. The power control function may either be setup or released with the IE.

```
TPC-PDCCH-Config ::=             CHOICE {
  release                        NULL,
  setup                          SEQUENCE {
    tpc-RNTI                     BIT STRING (SIZE (16)),
    tpc-Index                    TPC-Index
  }
}
TPC-PDCCH-ConfigSCell-r13 ::=    CHOICE {
  release                        NULL,
  setup                          SEQUENCE {
    tpc-Index-PUCCH-SCell-r13    TPC-Index
  }
}
TPC-PDCCH-ConfigSCell-r14 ::=    CHOICE {
  release                        NULL,
```

-continued

```
  setup                          SEQUENCE {
    tpc-Index-PUSCH-SCell-r14    TPC-Index
  }
}
TPC-Index ::=                    CHOICE {
  indexOfFormat3                 INTEGER (1..15),
  indexOfFormat3A                INTEGER (1..31)
}
```

In an example, indexOfFormat3 may be the index of N when DCI format 3 is used. In an example, indexOfFormat3A may be the index of M when DCI format 3A is used. In an example, tpc-Index may be the index of N or M. In an example, tpc-Index-PUCCH-SCell may be index of N or M, where N or M may be dependent on the used DCI format (e.g., format 3 or 3A). In an example, tpc-RNTI may be the RNTI for group power control (e.g., using DCI format 3/3A).

In an example, a common group power control DCI message (e.g., using format 3 or 3A) transmitted by the eNB on the primary cell may be used to power control PUSCH transmission of a group of semi-persistently scheduled UEs on a serving cell. In an example, the eNB may scramble the CRC bits associated with a DCI message with TPC-PUSCH-RNTI (or a value derived from TPC-PUSCH-RNTI depending on the serving cell) for power control of PUSCH transmissions of a group of UEs on a serving cell. In an example, the eNB may scramble the CRC of a DCI message with TPC-PUCCH-RNTI (or a value derived from TPC-PUCCH-RNTI depending on the serving cell) for power control of PUCCH transmissions of a group of UEs on a serving cell. In an example, the RNTI that scrambles the CRC of a received DCI message (e.g., indicated explicitly for the primary cell and derived for the secondary cells) may implicitly indicate the serving cell for the UE that the DCI message is directed to. In an example, the RRC configured parameter tpc-Index (for PUSCH/PUCCH power control on primary cell) or the RRC configured parameter tpc-Index-PUCCH-SCell (for PUCCH power control on a secondary cell) or the configured parameter (e.g., RRC configured) tpc-Index-PUSCH-SCell (for PUSCH power control on a secondary cell) may provide an index to the TPC command in the DCI message.

In an example, a UE may be indicated, e.g., implicitly or explicitly, for which SCell(s) the UE may expect a group power control DCI (e.g., a UE may expect group power control DCI on a secondary cell that is semi-persistently scheduled). A UE may limit the search for group power control DCI to SCell(s) that the UE may except such DCI. In an example, UE may search on the common search space of the primary cell for DCI with CRC scrambled with the cell-specific RNTIs that the UE is expecting to receive group power control DCI.

In an example embodiment, group power control DCI (e.g., DCI format 3 or 3A) may be directed to a group of UEs for their PUSCH transmission on a secondary cell. In an example, group power control DCI may be directed to a group of UEs for their PUCCH transmission on a secondary cell. In an example, the eNB may transmit one or more PDCCH with one or more group power control DCI message(s) on the primary cell for power control of a group of UEs for their PUSCH transmission on one or more serving cell(s) (e.g., primary cell and/or secondary cell). The eNB may configure a UE with tpc-PUSCH-RNTI and/or tpc-PUCCH-RNTI for group power control of PUSCH and PUCCH, respectively. The cyclic redundancy check (CRC)

bits associated with a group power control DCI transmitted on the PDCCH of the primary cell may be scrambled with tpc-PUSCH-RNTI (or a value derived from tpc-PUSCH-RNTI depending on a serving cell) or tpc-PUCCH-RNTI (or a value derived from tpc-PUCCH-RNTI depending on a serving cell) for PUSCH or PUCCH power control on the serving cell, respectively. In an example, the parameters tpc-Index-PUSCH-SCell1-r14 through tpc-Index-PUSCH-SCell31-r14 may be provided by higher layers (e.g., through RRC signaling) and may be used by a UE to determine the index to the TPC command for the UE's PUSCH transmission on the corresponding secondary cell. In an example, if a UE, configured with k≤31 secondary cells, receives the group power control DCI message on a secondary cell with cell index j (j≤k), the UE may use the parameter tpc-Index-PUSCH-SCellj-r14 to determine the index to the TPC command for the UE's PUSCH transmission on secondary cell with cell index j.

In an example, the range of values that tpc-PUSCH-RNTI or tpc-PUCCH-RNTI may take (e.g., 1 to 65523 in decimal or 0x0001 to 0xFFF3 in hexadecimal) may be partitioned among the serving cells (e.g., among the primary cell and secondary cells or among the primary cell and active secondary cells). In an example, the permissible range for tpc-PUSCH-RNTI or tpc-PUCCH-RNTI may be divided between the serving cells. In an example with 3 serving cells (e.g., one primary cell and two active secondary cells), tpc-PUSCH-RNTI or tpc-PUCCH-RNTI for PDCCH transmitted on the primary cell may take values in the range 1 to 21841, tpc-PUSCH-RNTI or tpc-PUCCH-RNTI for PDCCH transmitted on the secondary cell with smallest cell index may take values in the range 21842 to 43682, and tpc-PUSCH-RNTI or tpc-PUCCH-RNTI for PDCCH transmitted on the secondary cell with second smallest cell index may take values in the range 43683 to 65523. In an example, the eNB may configure a UE with a single tpc-RNTI (e.g., tpc-PUSCH-RNTI and/or TPC-PUCCH-RNTI) for primary cell and the tpc-RNTI for the secondary cells may be implicitly derived by the UE. In an example, if the tpc-RNTI is the nth position in the partition associated with the primary cell, the tpc-RNTI for a secondary cell is the nth position in the partition associated with the secondary cell.

In an example, the IE TPC-PDCCH-Config may be used to specify the RNTIs and indexes for PUCCH and PUSCH power control including PUSCH and/or PUCCH power control on a secondary cell. The power control function may either be setup or released with the IE.

```
TPC-PDCCH-Config ::=            CHOICE {
    release                         NULL,
    setup                           SEQUENCE {
        tpc-RNTI                        BIT STRING (SIZE (16)),
        tpc-Index                       TPC-Index
    }
}
TPC-PDCCH-ConfigSCell-r13 ::=   CHOICE {
    release                         NULL,
    setup                           SEQUENCE {
        tpc-Index-PUCCH-SCell-r13       TPC-Index
    }
}
TPC-PDCCH-ConfigSCell-r14 ::=   CHOICE {
    release                         NULL,
    setup                           SEQUENCE {
        tpc-Index-PUSCH-SCell1-r14      TPC-Index
        tpc-Index-PUSCH-SCell2-r14      TPC-Index
        ...
    }
}
```

-continued

```
TPC-Index ::=                   CHOICE {
    indexOfFormat3                  INTEGER (1..15),
    indexOfFormat3A                 INTEGER (1..31)
}
```

In an example, indexOfFormat3 may be the index of N when DCI format 3 is used. In an example, indexOfFormat3A may be the index of M when DCI format 3A is used. In an example, tpc-Index may be the index of N or M. In an example, tpc-Index-PUCCH-SCell may be index of N or M, where N or M may be dependent on the used DCI format (e.g., format 3 or 3A). In an example, tpc-RNTI may be the RNTI for group power control (e.g., using DCI format 3/3A). In an example, tpc-Index-PUSCH-SCell1, . . . , tpc-Index-PUSCH-SCell31 may be index of N or M, where N or M may be dependent on the used DCI format (e.g., format 3 or 3A).

In an example embodiment, a common group power control DCI message (e.g., using format 3 or 3A) transmitted by the eNB on the primary cell may be used to power control PUSCH transmission of a group of semi-persistently scheduled UEs on a serving cell. In an example, the eNB may scramble the CRC bits associated with a DCI message with TPC-PUSCH-RNTI (or a value derived from TPC-PUSCH-RNTI depending on the serving cell) for power control of PUSCH transmissions of a group of UEs on a serving cell. In an example, the eNB may scramble the CRC bits associated with a DCI message with TPC-PUCCH-RNTI (or a value derived from TPC-PUCCH-RNTI depending on the serving cell) for power control of PUCCH transmissions of a group of UEs on a serving cell. In an example, the RNTI that scrambles the CRC bits associated with a received DCI message (e.g., indicated explicitly for the primary cell and derived for the secondary cells) may implicitly indicate the serving cell for the UE that the DCI message is directed to. In an example, the RRC configured parameter tpc-Index (for PUSCH/PUCCH power control on primary cell) or the RRC configured parameter tpc-Index-PUCCH-SCell (for PUCCH power control on a secondary cell) or the configured parameter (e.g., RRC configured) tpc-Index-PUSCH-SCellj (for PUSCH power control on a secondary cell with cell index j) may provide an index to the TPC command in the DCI message.

In an example, a UE may be indicated, e.g., implicitly or explicitly, for which SCell(s) the UE may expect a group power control DCI (e.g., a UE may expect group power control DCI on a secondary cell that is semi-persistently scheduled). A UE may limit the search for group power control DCI to SCell(s) that the UE may except such DCI. In an example, UE may search on the common search space of the primary cell for DCI with CRC scrambled with the cell-specific RNTIs that the UE is expecting to receive group power control DCI.

In an example embodiment, a group power control DCI (e.g., DCI format 3 or 3A) may be directed to a group of UEs for their PUSCH transmission on one or more serving cells. In an example, a group power control DCI (e.g., DCI format 3 or 3A) may be directed to a group of UEs for their PUCCH transmission on one or more serving cell(s). In an example, the eNB may transmit a PDCCH with a group power control DCI on the primary cell for group power control of a group of UEs for their PUSCH transmission on one or more serving cells. The eNB may configure a UE with tpc-PUSCH-RNTI and/or tpc-PUCCH-RNTI for group power control of PUSCH and PUCCH, respectively. The cyclic redundancy check (CRC) bits associated with a group power control DCI transmitted on the PDCCH of the primary cell may be scrambled with tpc-PUSCH-RNTI or tpc-PUCCH-RNTI for PUSCH or PUCCH power control on or more serving cell(s), respectively. In an example, the parameter tpc-Index-PUSCH-SCell-r14 may be provided by higher layers (e.g., through RRC signaling) and may be used by a UE to determine the index to the TPC command for the UE's PUSCH transmission on a secondary cell.

In an example, the IE TPC-PDCCH-Config may be used to specify the RNTIs and indexes for PUCCH and PUSCH power control including PUSCH and/or PUCCH power control on a secondary cell. The power control function may either be setup or released with the IE.

```
TPC-PDCCH-Config ::=            CHOICE {
    release                     NULL,
    setup                       SEQUENCE {
        tpc-RNTI                BIT STRING (SIZE (16)),
        tpc-Index               TPC-Index
    }
}
TPC-PDCCH-ConfigSCell-r13 ::=   CHOICE {
    release                     NULL,
    setup                       SEQUENCE {
        tpc-Index-PUCCH-SCell-r13   TPC-Index
    }
}
TPC-PDCCH-ConfigSCell-r14 ::=   CHOICE {
    release                     NULL,
    setup                       SEQUENCE {
        tpc-Index-PUSCH-SCell-r14   TPC-Index
    }
}
TPC-Index ::=                   CHOICE {
    indexOfFormat3              INTEGER (1..15),
    indexOfFormat3A             INTEGER (1..31)
}
```

In an example, indexOfFormat3 may be the index of N when DCI format 3 is used. In an example, indexOfFormat3A may be the index of M when DCI format 3A is used. In an example, tpc-Index may be the index of N or M. In an example, tpc-Index-PUCCH-SCell may be index of N or M, where N or M may be dependent on the used DCI format (e.g., format 3 or 3A). In an example, tpc-RNTI may be the RNTI for group power control (e.g., using DCI format 3/3A). In an example, tpc-Index-PUSCH-SCell may be index of N or M, where N or M may be dependent on the used DCI format (e.g., format 3 or 3A).

In an example embodiment, a common group power control DCI (e.g., format 3 or 3A) transmitted by the eNB on the primary cell may be used to power control PUSCH transmission of a group of semi-persistently scheduled UEs on one or more serving cell(s). In an example, the eNB may scramble the CRC of a DCI message with TPC-PUSCH-RNTI for power control of PUSCH transmissions of a group of UEs on one or more serving cell(s). In an example, the eNB may scramble the CRC of a DCI message with TPC-PUCCH-RNTI for power control of PUCCH transmissions of a group of UEs on one or more serving cell(s). In an example, the RRC configured parameter tpc-Index (for PUSCH/PUCCH power control on the primary cell) or the RRC configured parameter tpc-Index-PUCCH-SCell (for PUCCH power control on a secondary cell) or the configured parameter (e.g., RRC configured) tpc-Index-PUSCH-SCell (for PUSCH power control on the secondary cell) may provide an index to the TPC command in the DCI message.

In an example embodiment, a group power control DCI (e.g., DCI format 3 or 3A) may be directed to a group of UEs for their PUSCH transmission on one or more serving cells. In an example, a group power control DCI (e.g., DCI format 3 or 3A) may be directed to a group of UEs for their PUCCH transmission on one or more serving cell(s). In an example, the eNB may transmit a PDCCH with a group power control DCI on the primary cell for group power control of a group of UEs for their PUSCH transmission on one or more serving cells. The eNB may configure a UE with tpc-PUSCH-RNTI and/or tpc-PUCCH-RNTI for group power control of PUSCH and PUCCH, respectively. The cyclic redundancy check (CRC) bits associated with a group power control DCI transmitted on the PDCCH of the primary cell may be scrambled with tpc-PUSCH-RNTI or tpc-PUCCH-RNTI for PUSCH or PUCCH power control on or more serving cell(s), respectively. In an example, the parameters tpc-Index-PUSCH-SCell1-r14 through tpc-Index-PUSCH-SCell31-r14 may be provided by higher layers (e.g., through RRC signaling) and may be used by a UE to determine the index to the TPC command for the UE's PUSCH transmission on the corresponding secondary cell. In an example, if a UE, configured with k≤31 secondary cells, the UE may use the parameter tpc-Index-PUSCH-SCellj-r14 to determine the index to the TPC command for the UE's PUSCH transmission on secondary cell with cell index j. In an example, the eNB may configure a UE with tpc-Index-PUSCH-SCell for a subset of its active secondary cells (e.g. the cell with SPS configuration) that may be group power controlled.

In an example, the IE TPC-PDCCH-Config may be used to specify the RNTIs and indexes for PUCCH and PUSCH power control including PUSCH and/or PUCCH power control on a secondary cell. The power control function may either be setup or released with the IE.

```
TPC-PDCCH-Config ::=            CHOICE {
    release                     NULL,
    setup                       SEQUENCE {
        tpc-RNTI                BIT STRING (SIZE (16)),
        tpc-Index               TPC-Index
    }
}
TPC-PDCCH-ConfigSCell-r13 ::=   CHOICE {
    release                     NULL,
    setup                       SEQUENCE {
        tpc-Index-PUCCH-SCell-r13   TPC-Index
    }
}
TPC-PDCCH-ConfigSCell-r14 ::=   CHOICE {
    release                     NULL,
    setup                       SEQUENCE {
        tpc-Index-PUSCH-SCell1-r14  TPC-Index
        tpc-Index-PUSCH-SCell2-r14  TPC-Index
        ...
        tpc-Index-PUSCH-SCell31-r14 TPC-Index
    }
}
TPC-Index ::=                   CHOICE {
    indexOfFormat3              INTEGER (1..15),
    indexOfFormat3A             INTEGER (1..31)
}
```

In an example, indexOfFormat3 may be the index of N when DCI format 3 is used. In an example, indexOfFormat3A may be the index of M when DCI format 3A is used. In an example, tpc-Index may be the index of N or M. In an example, tpc-Index-PUCCH-SCell may be index of N or M, where N or M may be dependent on the used DCI format (e.g., format 3 or 3A). In an example, tpc-RNTI may be the RNTI for group power control (e.g., using DCI format 3/3A). In an example, tpc-Index-PUSCH-SCell1, . . . , tpc-Index-PUSCH-SCell31 may be index of N or M, where N or M may be dependent on the used DCI format (e.g., format 3 or 3A).

In an example, a common group power control DCI (e.g., format 3 or 3A) transmitted by the eNB on the primary cell may be used to power control PUSCH transmission of a group of semi-persistently scheduled UEs on one or more serving cell(s). In an example, the eNB may scramble the CRC bits associated with a DCI message with TPC-PUSCH-RNTI for power control of PUSCH transmissions of a group of UEs on one or more serving cell(s). In an example, the eNB may scramble the CRC bits associated with a DCI message with TPC-PUCCH-RNTI for power control of PUCCH transmissions of a group of UEs on one or more serving cell(s). In an example, the RRC configured parameter tpc-Index (for PUSCH/PUCCH power control on the primary cell) or the RRC configured parameter tpc-Index-PUCCH-SCell (for PUCCH power control on a secondary cell) or the configured parameter (e.g., RRC configured) tpc-Index-PUSCH-SCellj (for PUSCH power control on the secondary cell with cell index j) may provide an index to the TPC command in the DCI message.

According to various embodiments, a device (such as, for example, a wireless device, off-network wireless device, a base station, and/or the like), may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 19:
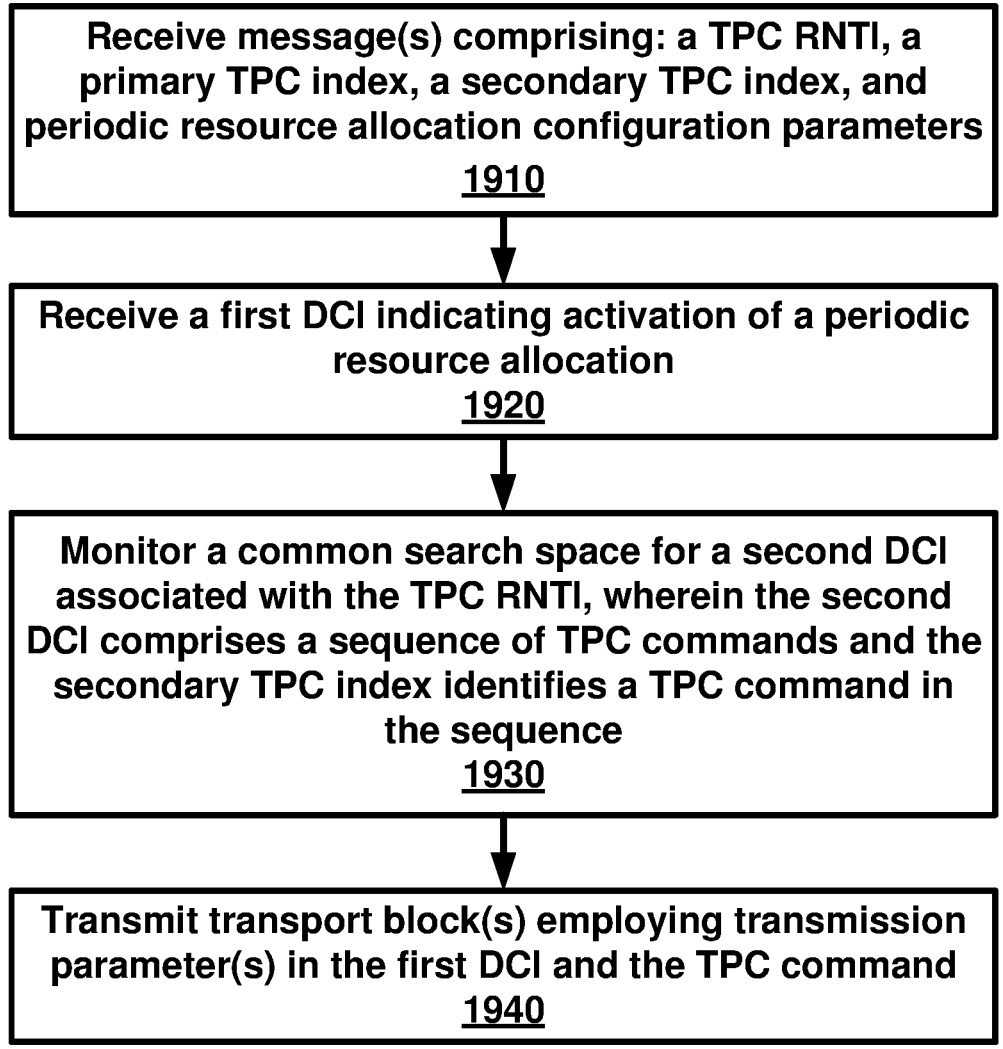
FIG. 19 is an example flow diagram as per an aspect of an embodiment of the present disclosure.

FIG. 19 is an example flow diagram as per an aspect of an embodiment of the present disclosure. At 1910, a wireless device may receive one or more messages. The one or more messages may comprise configuration parameters for a plurality of cells comprising a primary cell and a secondary cell. The configuration parameters may comprise: a transmit power control (TPC) radio network temporary identifier (RNTI), a primary TPC index for a first physical uplink shared channel (PUSCH) of the primary cell, a secondary TPC index for a second PUSCH of the secondary cell, and periodic resource allocation configuration parameters configuring a periodic resource allocation for the secondary cell. At 1920, a first downlink control information (DCI) may be received. The DCI may indicate activation of the periodic resource allocation. A common search space for a second DCI associated with the TPC RNTI may be monitored at 1930. The second DCI may comprise a sequence of TPC commands. The secondary TPC index may identify a TPC command in the sequence. At 140, one or more transport blocks may be transmitted by the wireless device employing one or more transmission parameters in the first DCI and the TPC command.

According to an embodiment, the periodic resource allocation may comprise semi-persistent scheduling. According to an embodiment, the common search space may be on the primary cell. According to an embodiment, the common search space may be on the secondary cell. According to an embodiment, the wireless device may further receive a message indicating whether the wireless device is expected to monitor the common search space on the secondary cell. According to an embodiment, the second DCI may have a first format or a second format. According to an embodiment, the TPC command may comprise two bits in response to the second DCI having the first format, otherwise the TPC command comprises a single bit. According to an embodiment, the two bits may represent minus one decibel (dB), zero dB, plus one dB or three dB and the single bit represents minus one dB or plus one dB. According to an embodiment, the configuration parameters further comprise a second TPC RNTI. According to an embodiment, the first format is 3 and the second format is 3A.

Figure 20:
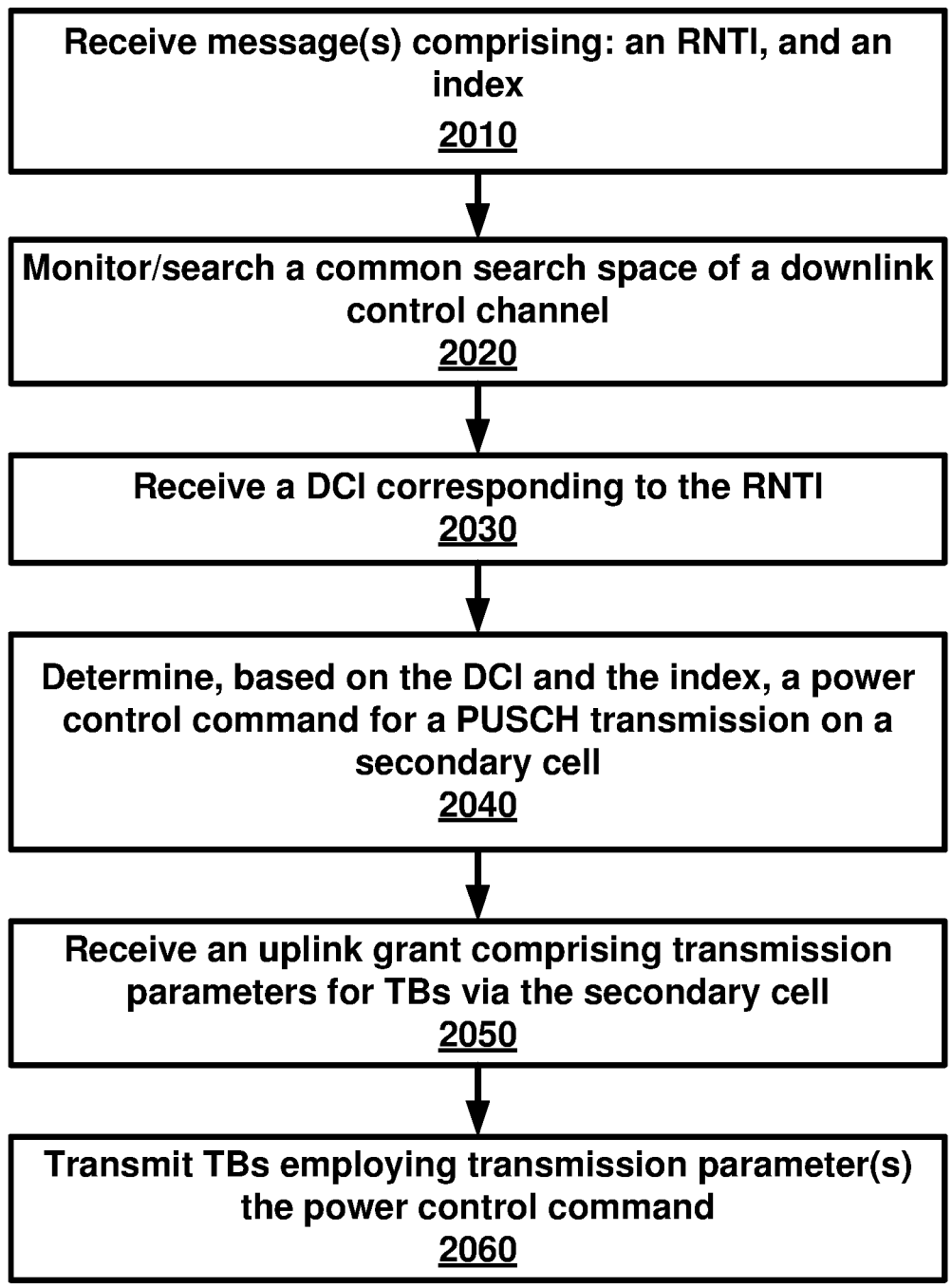
FIG. 20 is an example flow diagram as per an aspect of an embodiment of the present disclosure.

FIG. 20 is an example flow diagram as per an aspect of an embodiment of the present disclosure. At 2010, a wireless device may receive one or more messages. The one or more messages may comprise configuration parameters for a plurality of cells comprising a secondary cell, the configuration parameters for the secondary cell comprising a radio network temporary identifier (RNTI) and an index. At 2020, the wireless device may monitor/search a common search space of a downlink control channel. At 2030, a downlink control information (DCI) corresponding to the RNTI may be received. At 2040, a determination may be made, based on the DCI and the index, of a power control command for a physical uplink shared channel (PUSCH) transmission on the secondary cell. At 2050, the wireless device may receive an uplink grant comprising transmission parameters for one or more transport blocks (TBs) via the secondary cell. At 2060, the wireless device may transmit the power control command by the one or more TBs employing the transmission parameters.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={call, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages. In an example, an IE may be a sequence of first parameters (first IEs). The sequence may comprise one or more first parameters. For example, a sequence may have a length max_length (e.g. 1, 2, 3, etc). A first parameter in the sequence may be identified by the parameter index in the sequence. The sequence may be ordered.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/ simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above-mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, one or more messages comprising configuration parameters for a plurality of cells comprising a primary cell and a secondary cell, wherein the configuration parameters comprise:
      a transmit power control (TPC) radio network temporary identifier (RNTI);
      a primary TPC index for a first physical uplink shared channel (PUSCH) of the primary cell;
      a secondary TPC index for a second PUSCH of the secondary cell; and
      periodic resource allocation configuration parameters configuring a periodic resource allocation for transmission of transport blocks via the second PUSCH of the secondary cell;
   receiving first downlink control information (DCI) indicating activation of the periodic resource allocation for transmission of transport blocks via the second PUSCH of the secondary cell;
   monitoring a common search space for a-second DCI associated with the TPC RNTI, wherein the second DCI comprises a sequence of TPC commands, and wherein the secondary TPC index indicates a TPC command in the sequence; and
   transmitting, via the second PUSCH and based on the first DCI and the TPC command, one or more transport blocks.

2. The method of claim 1, wherein the periodic resource allocation is semi-persistent scheduling.

3. The method of claim 1, wherein the common search space is on the primary cell or on the secondary cell.

4. The method of claim 3, further comprising receiving a message indicating whether the wireless device is expected to monitor the common search space.

5. The method of claim 1, wherein a format of the second DCI is DCI format 3 or DCI format 3A.

6. The method of claim 1, wherein the TPC command comprises two bits based on the second DCI being DCI format 3, and wherein the TPC command comprises a single bit based on the second DCI being DCI format 3A.

7. The method of claim 6, wherein the two bits represent minus one decibel (dB), zero dB, plus one dB, or three dB, and wherein the single bit represents minus one dB or plus one dB.

8. The method of claim 1, wherein the configuration parameters further comprise a second TPC RNTI.

9. A wireless device comprising:
   one or more processors; and
   memory storing instructions that, when executed by the one or more processors, cause the wireless device to:
      receive one or more messages comprising configuration parameters for a plurality of cells comprising a primary cell and a secondary cell, wherein the configuration parameters comprise:
         a transmit power control (TPC) radio network temporary identifier (RNTI);
         a primary TPC index for a first physical uplink shared channel (PUSCH) of the primary cell;
         a secondary TPC index for a second PUSCH of the secondary cell; and
         periodic resource allocation configuration parameters configuring a periodic resource allocation for transmission of transport blocks via the second PUSCH of the secondary cell; and receive first downlink control information (DCI) indicating activation of the periodic resource allocation for transmission of transport blocks via the second PUSCH of the secondary cell;

monitor a common search space for a-second DCI associated with the TPC RNTI, wherein the second DCI comprises a sequence of TPC commands, and wherein the secondary TPC index indicates a TPC command in the sequence; and transmit, via the second PUSCH and based on the first DCI and the TPC command, one or more transport blocks.

10. The wireless device of claim 9, wherein the periodic resource allocation is semi-persistent scheduling.

11. The wireless device of claim 9, wherein the common search space is on the primary cell or on the secondary cell.

12. The wireless device of claim 11, wherein the instructions, when executed, further cause the wireless device to receive a message indicating whether the wireless device is expected to monitor the common search space.

13. The wireless device of claim 9, wherein a format of the second DCI is DCI format 3 or DCI format 3A.

14. The wireless device of claim 9, wherein the TPC command comprises two bits based on the second DCI being DCI format 3, and wherein the TPC command comprises a single bit based on the second DCI being DCI format 3A.

15. The wireless device of claim 14, wherein the two bits represent minus one decibel (dB), zero dB, plus one dB, or three dB, and wherein the single bit represents minus one dB or plus one dB.

16. The wireless device of claim 9, wherein the configuration parameters further comprise a second TPC RNTI.

17. A system comprising:
a wireless device; and
a base station;
wherein the base station is configured to:
send one or more messages comprising configuration parameters for a plurality of cells comprising a primary cell and a secondary cell, wherein the configuration parameters comprise:
a transmit power control (TPC) radio network temporary identifier (RNTI);
a primary TPC index for a first physical uplink shared channel (PUSCH) of the primary cell;
a secondary TPC index for a second PUSCH of the secondary cell; and
periodic resource allocation configuration parameters configuring a periodic resource allocation for transmission of transport blocks via the second PUSCH of the secondary cell; and
send first downlink control information (DCI) indicating activation of the periodic resource allocation for transmission of transport blocks via the second PUSCH of the secondary cell; and wherein the wireless device is configured to:
monitor a common search space for second DCI associated with the TPC RNTI, wherein the second DCI comprises a sequence of TPC commands, and wherein the secondary TPC index indicates a TPC command in the sequence; and
send, via the second PUSCH and based on the first DCI and the TPC command, one or more transport blocks.

18. The system of claim 17, wherein the periodic resource allocation is semi-persistent scheduling.

19. The system of claim 17, wherein the common search space is on the primary cell or on the secondary cell.

20. The system of claim 19, wherein the wireless device is further configured to receive a message indicating whether the wireless device is expected to monitor the common search space.

21. The system of claim 17, wherein a format of the second DCI is DCI format 3 or DCI format 3A.

22. The system of claim 17, wherein the TPC command comprises two bits based on the second DCI being DCI format 3, and wherein the TPC command comprises a single bit based on the second DCI being DCI format 3A.

23. The system of claim 22, wherein the two bits represent minus one decibel (dB), zero dB, plus one dB, or three dB, and wherein the single bit represents minus one dB or plus one dB.

24. The system of claim 17, wherein the configuration parameters further comprise a second TPC RNTI.

* * * * *

UNITED STATES PATENT AND TRADEMARK OFFICE
CERTIFICATE OF CORRECTION

PATENT NO. : 10,687,319 B2
APPLICATION NO. : 15/671801
DATED : June 16, 2020
INVENTOR(S) : Babaei et al.

It is certified that error appears in the above-identified patent and that said Letters Patent is hereby corrected as shown below:

On the Title Page

Page 3, Column 2, item (56), Other Publications, Line 20:
Please delete "Souce:" and insert --Source:--

Page 4, Column 1, item (56), Other Publications, Line 63:
Please delete "Souce:" and insert --Source:--

Page 4, Column 2, item (56), Other Publications, Line 48:
Please delete "Souce:" and insert --Source:--

Page 5, Column 2, item (56), Other Publications, Line 25:
Please delete "Souce:" and insert --Source:--

In the Specification

Column 10, Detailed Description of Embodiments, Line 39:
Please delete "and/orif" and insert --and/or if--

Column 13, Detailed Description of Embodiments, Line 41:
Please delete "V21," and insert --V2I,--

Column 23, Detailed Description of Embodiments, Line 33:
Please delete "SCell1" and insert --SCellj--

Column 38, Detailed Description of Embodiments, Line 35:
Please delete "B={call," and insert --B = {cell1,--

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,687,319 B2

In the Claims

Column 40, Claim 1, Line 23:
Please delete "a-second" and insert --second--